(12) United States Patent
Jones et al.

(10) Patent No.: US 7,692,321 B2
(45) Date of Patent: Apr. 6, 2010

(54) POWER CONVERTERS

(75) Inventors: Rodney Jones, Stoke On Trent (GB); Paul Brian Brogan, Glasgow (GB); Erik Grøndahl, Them (DK); Henrik Stiesdal, Odense C (DK)

(73) Assignee: Converteam Ltd, Warwickshire (GB)

( * ) Notice: Subject to any disclaimer, the term of this patent is extended or adjusted under 35 U.S.C. 154(b) by 0 days.

(21) Appl. No.: 12/322,542

(22) Filed: Feb. 4, 2009

(65) Prior Publication Data
US 2009/0146426 A1  Jun. 11, 2009

Related U.S. Application Data

(60) Division of application No. 11/598,443, filed on Nov. 13, 2006, now Pat. No. 7,511,385, which is a continuation-in-part of application No. 11/292,669, filed on Dec. 2, 2005, now Pat. No. 7,372,174.

(60) Provisional application No. 60/736,205, filed on Nov. 14, 2005.

(30) Foreign Application Priority Data
Nov. 11, 2005 (GB) ................................. 0523087.5

(51) Int. Cl.
*H20P 9/00* (2006.01)

(52) U.S. Cl. ............................. 290/43; 290/44; 290/55; 322/44

(58) Field of Classification Search .................... 290/44, 290/43, 55; 322/44
See application file for complete search history.

(56) References Cited

U.S. PATENT DOCUMENTS 4,956,598 A  9/1990  Recker et al.

(Continued)

FOREIGN PATENT DOCUMENTS

GB      2 295 506 A      5/1996

(Continued)

OTHER PUBLICATIONS

*Optimal Control of a Variable Speed Wind Turbine Under Dynamic Wind Conditions*, A. McIver, et al., Industry Applications Conference, 1996 Thirty-First IAS Annual Meeting, IAS '96 Conference Record of the 1996 IEEE San Diego, CA, Oct. 1996, pp. 1692-1698.

(Continued)

*Primary Examiner*—T C Patel
*Assistant Examiner*—Iraj A Mohandesi
(74) *Attorney, Agent, or Firm*—Kirschstein, et al.

(57) ABSTRACT

The present invention provides a power converter that can be used to interface a generator (4) that provides variable voltage at variable frequency to a supply network operating at nominally fixed voltage and nominally fixed frequency and including features that allow the power converter to remain connected to the supply network and retain control during supply network fault and transient conditions. The power converter includes a generator bridge (10) electrically connected to the stator of the generator (4) and a network bridge (14). A dc link (12) is connected between the generator bridge (10) and the network bridge (14). A filter (16) having network terminals is connected between the network bridge (14) and the supply network. A first controller (18) is provided for controlling the operation of the semiconductor power switching devices of the generator bridge (14). Similarly, a second controller (46) is provided for controlling the operation of the semiconductor power switching devices of the network bridge (14). The first controller (18) uses a dc link voltage demand signal (VDC_GEN*) indicative of a desired dc link voltage to control the semiconductor power switching devices of the network bridge (10) to achieve the desired level of dc link voltage that corresponds to the dc link voltage demand signal (VDC_GEN*). The second controller (46) uses a power demand signal (P*) indicative of the level of power to be transferred from the dc link to the supply network through the network bridge (14), and a voltage demand signal (VTURB*) indicative of the voltage to be achieved at the network terminals of the filter (16) to control the semiconductor power switching devices of the network bridge (14) to achieve the desired levels of power and voltage that correspond to the power and voltage demand signals (P* and VTURB*).

1 Claim, 14 Drawing Sheets

U.S. PATENT DOCUMENTS

| | | | |
|---|---|---|---|
| 5,225,712 A | 7/1993 | Erdman | |
| 5,317,500 A | 5/1994 | Iden et al. | |
| 6,269,010 B1 | 7/2001 | Ma et al. | |
| 7,042,110 B2 * | 5/2006 | Mikhail et al. | 290/44 |
| 7,071,579 B2 * | 7/2006 | Erdman et al. | 290/55 |
| 7,372,172 B2 * | 5/2008 | Winkler et al. | 290/43 |
| 7,372,174 B2 * | 5/2008 | Jones et al. | 290/44 |

FOREIGN PATENT DOCUMENTS

| | | |
|---|---|---|
| GB | 2 423 650 A | 8/2006 |
| WO | WO 92/15148 | 9/1992 |
| WO | WO 2004/040748 A1 | 5/2004 |
| WO | WO 2004/098261 A2 | 11/2004 |

OTHER PUBLICATIONS

*A Variable Speed Wind Energy Conversion Scheme for Connection to Weak AC Systems*, A. S. Neris, et al., IEEE Transactions on Energy Conversion, IEEE Service Center, Mar. 1999, pp. 122-127.

* cited by examiner

POWER CONVERTERS

CROSS REFERENCE TO RELATED APPLICATION

This application claims the benefit of U.S. Patent Provisional Application Ser. No. 60/736,205, filed Nov. 14, 2005 and is a division of U.S. patent application Ser. No. 11/598,443, filed Nov. 13, 2006, now U.S. Pat. No. 7,511,385 now allowed, which is a continuation-in-part of U.S. patent application Ser. No. 11/292,669, filed Dec. 2, 2005, now U.S. Pat. No. 7,372,174.

FIELD OF THE INVENTION

The present invention relates to power converters, and in particular to power converters that can be used to interface generators providing variable voltage at variable frequency to a power grid or supply network at nominally fixed voltage and frequency. The present invention also includes features that allow the power converters to remain connected to the supply network and retain control during network fault and transient conditions. The power converters are particularly suitable for use with, but not restricted to, generators that are driven by wind turbines.

BACKGROUND OF THE INVENTION

It is possible to convert wind energy to electrical energy by using a wind turbine to drive the rotor of a generator, either directly or by means of a gearbox. The ac frequency that is developed at the stator terminals of the generator (the "stator voltage") is directly proportional to the speed of rotation of the rotor. The voltage at the generator terminals also varies as a function of speed and, depending on the particular type of generator, on the flux level. For optimum energy capture, the speed of rotation of the output shaft of the wind turbine will vary according to the speed of the wind driving the turbine blades. To limit the energy capture at high wind speeds, the speed of rotation of the output shaft is controlled by altering the pitch of the turbine blades. Matching of the variable voltage and frequency of the generator to the nominally constant voltage and frequency of the power network can be achieved by using a power converter.

U.S. Pat. No. 5,083,039 describes a variable speed wind turbine where the rotating shaft of the wind turbine is used to drive the rotor of an ac induction generator. A power converter is used to interface the generator output to a power network. The power converter includes active semiconductor power switching devices that control the stator electrical quantities in each phase of the generator. A torque command device is used to derive a torque demand signal indicative of a desired torque. A generator controller operates under field orientation control and is responsive to the torque demand signal to define a desired quadrature axis current that represents torque in rotating field coordinates normal to the rotor flux field. The active semiconductor power switching devices are then controlled by the generator controller using a pulse width modulation circuit to produce stator electrical quantities that correspond to the desired quadrature axis current. An inverter controller regulates the output current to supply multi-phase ac power having leading or lagging currents at an angle specified by a power factor control signal. In this arrangement, a loss of network voltage during a supply dip leads to loss of control of the dc link voltage. Consequently, the ability to control the reactive current that is essential for voltage support functions demanded by the network codes is also lost.

U.S. Pat. No. 5,225,712 expands on the principle set out above to include reactive power control or power factor angle control as a function of a mode switch. In a similar manner, the inverter bridge controller scheme of U.S. Pat. No. 5,225,712 is solely responsible for regulating the dc link voltage. Both schemes therefore suffer from the disadvantage that during the situation where the network voltage is lost, then the dc link voltage control and the ability to control reactive current during the voltage dip are also lost.

SUMMARY OF THE INVENTION

The present invention aims to at least reduce the above problems and disadvantages by providing a power converter that can be used to interface a generator that provides variable voltage at variable frequency to a supply network operating at nominally fixed voltage and nominally fixed frequency, the power converter comprising:

a first active rectifier/inverter electrically connected to the stator of the generator and including a plurality of semiconductor power switching devices;

a second active rectifier/inverter including a plurality of semiconductor power switching devices;

a dc link connected between the first active rectifier/inverter and the second active rectifier/inverter;

a filter connected between the second active rectifier/inverter and the supply network, the filter including network terminals;

a first controller for the first active rectifier/inverter; and a second controller for the second active rectifier/inverter;

wherein the first controller uses a dc link voltage demand signal indicative of a desired dc link voltage to control the semiconductor power switching devices of the first active rectifier/inverter to achieve the desired level of dc link voltage that corresponds to the dc link voltage demand signal; and wherein the second controller uses a power demand signal indicative of the level of power to be transferred from the dc link to the supply network through the second active rectifier/inverter, and a voltage demand signal indicative of the voltage to be achieved at the network terminals of the filter to control the semiconductor power switching devices of the second active rectifier/inverter to achieve the desired levels of power and voltage that correspond to the power and voltage demand signals.

The power converter can be used to interface the generator to the supply network during normal operating conditions but also includes features that allow it to operate in situations where the supply network voltage is varying due to grid faults or transients on the supply network. More particularly, the second controller can use a measure of the supply network voltage to determine limits on the power that can be exported from the second active rectifier/inverter when the supply network voltage deviates from its nominal condition and can also use the measure of the supply network voltage to determine the level of current that is to be provided from the second active rectifier/inverter to provide voltage support to the supply network when the supply network voltage deviates from its nominal condition.

The generator can be a linear or rotating generator of any suitable type. Examples would include an induction generator or a synchronous generator excited by any suitable means such as permanent magnets or conventional or superconducting field windings. In the case of a rotating generator, the rotor can be connected to, or driven by, the output shaft of a turbine or prime mover such as a wind turbine, a tidal turbine, a hydro-turbine, a steam turbine engine, a diesel engine or a gas turbine engine, for example. A linear generator could be used in applications that inherently benefit from reciprocating motion, for example wave power generators.

The first controller preferably uses a flux demand signal indicative of a desired level of flux to be achieved in the generator and converts this to a direct axis current demand signal for the first active rectifier/inverter. The first controller can then use the direct axis current demand signal to control the operation of the semiconductor power switching devices of the first active rectifier/inverter to produce stator electrical quantities that achieve the desired direct axis current for the first active rectifier/inverter. The term "stator electrical quantities" is used herein to refer to any and all of the individual phase voltage magnitude, individual phase current magnitude, phase and frequency in a multi-phase generator.

The operation of the semiconductor power switching devices in the first active rectifier/inverter can be controlled using gate drive control signals derived in accordance with a conventional pulse width modulation strategy. It will be readily appreciated that various types of pulse width modulation strategy can be considered. In a preferred aspect of the present invention with a two-level voltage source inverter then a fixed frequency pulse width modulation strategy can be implemented as follows. In a digital processor, the output voltage requirement determined from the combination of direct and quadrature axis voltage signals is multiplied by the value of a triplen enhanced sine waveform determined by the value of the angle at which the output voltage is to be applied for a given phase in the active rectifier/inverter. A triplen enhanced sine waveform is used to maximise the output voltage that can be achieved at the ac terminals of the active rectifier/inverter block for a given dc link voltage. The resultant signal is compared to a triangular waveform running at fixed frequency to determine the specific switching times of the upper and lower semiconductor power switching devices in that phase of the active rectifier/inverter. To overcome the known switching delays and prevent the simultaneous conduction of the upper and lower semiconductor power switching devices, blanking periods can be imposed on the specific switching times between the upper semiconductor power switching device being turned off and the lower semiconductor power switching device being turned on. Corresponding blanking periods are imposed between the lower semiconductor power switching device being turned off and the upper semiconductor power switching device being turned on. The same process is repeated for each phase of the active rectifier/inverter.

The first controller preferably converts the flux demand signal to the direct current axis demand signal with reference to one or more characteristics of the generator. The characteristics might include the generator equivalent circuit parameters and/or nameplate data such as rated current, voltage, speed, power and frequency and data such as the magnetisation curve. The magnetisation curve provides the relationship between stator flux for the generator and the direct axis current necessary to achieve it. Typically, the magnetisation curve for a generator will show a linear relationship between stator flux and direct axis current up to a certain level of flux. However, beyond this certain level small increases in flux will require larger increases in direct axis current. This non-linear region is associated with the saturation of the iron used to form the magnetic circuit of the generator. The magnetisation curve can be derived from the test process for the generator during its manufacture or by current injection tests carried out during the generator commissioning step. Such current injection tests can be arranged to be automatic as part of a self-commissioning routine for the power converter/generator combination.

The first controller preferably compares the dc link voltage demand signal indicative of a desired dc link voltage to a dc link voltage feedback signal to determine a quadrature axis current demand signal for the first active rectifier/inverter. The first controller can then control the semiconductor power switching devices of the first active rectifier/inverter to produce stator electrical quantities that achieve the desired quadrature axis current for the first active rectifier/inverter.

The second controller may supply a control signal that varies in accordance with the prevailing supply network voltage conditions to the first controller. This enables the first controller to compare the dc link voltage demand signal indicative of a desired dc link voltage to the dc link voltage feedback signal to determine a dc link current demand signal and then limit the dc link current demand signal using the control signal from the second controller to determine a limited dc link current demand signal. The limited dc link current demand signal can then be used by the first controller to determine the quadrature axis current demand signal for the first active rectifier/inverter.

Alternatively, the second controller may supply a control signal that varies in accordance with the prevailing supply network voltage conditions and/or the power demand signal to the first controller. This enables a dc link voltage controller of the first controller to compare the dc link voltage demand signal indicative of a desired dc link voltage to the dc link voltage feedback signal to provide an output signal that is added to the control signal to determine a dc link current demand signal. The dc current demand signal can then be used to determine the quadrature axis current demand signal for the first active rectifier/inverter.

The second controller preferably converts the power demand signal indicative of the level of power to be transferred from the dc link to the supply network through the second active rectifier/inverter to a quadrature axis current demand signal for the second active rectifier/inverter. The second controller can then control the semiconductor power switching devices of the second active rectifier/inverter to produce filter/supply network electrical quantities that achieve the desired quadrature axis current for the second active rectifier/inverter. The term "filter/supply network electrical quantities" is used herein to refer to any and all of the individual phase voltage magnitude, individual phase current magnitude, phase and frequency in a multi-phase active rectifier/inverter system. The term "multi-phase" refers typically to three-phase but can include other numbers of phases. The operation of the semiconductor power switching devices in the second active rectifier/inverter can also be controlled using gate drive control signals derived in accordance with a conventional pulse width modulation strategy.

The power demand signal can be converted into the quadrature axis current demand signal by dividing the power demand signal by a signal that is derived from the voltage at the network terminals of the filter. This signal is preferably the quadrature axis component of the ac voltage that is derived from three phase-voltage measurement on the network side of the filter. Alternatively, the power demand signal may be converted into the quadrature axis current demand signal by dividing the power demand signal by a filtered version of the signal that is derived from the voltage at the network terminals of the filter.

The second controller preferably uses a further dc link voltage demand signal indicative of a desired dc link voltage and compares the further dc link voltage demand signal to the dc link voltage feedback signal to determine an unlimited quadrature axis current demand signal. The unlimited quadrature axis current demand signal can then be limited to determine the quadrature axis current demand signal for the second active rectifier/inverter. The unlimited quadrature axis current demand signal can be limited to a value that is determined by a limiting signal that in turn is preferably derived from the power demand signal.

The unlimited quadrature axis current demand signal can be added to a quadrature axis current feedforward signal that is derived from the following signals: a signal indicative of the generator power, a voltage feedback signal measured at the network terminals of the filter and a gain signal that varies in accordance with the prevailing supply network voltage conditions.

The signal indicative of the generator power may be supplied to the second controller from the first controller. Alternatively, the signal indicative of the generator power minus the output of a PI controller of a dc link voltage controller of the first controller may be supplied to the second controller and is used by the second controller only during a supply voltage dip situation.

The second controller can modify the limiting signal that is derived from the power demand signal in accordance with the prevailing supply network voltage conditions. The limiting signal can be modified by the second controller in response to deviations in the supply network from nominal voltage conditions, for example during supply network fault or transient conditions. This will result in changes of power transfer to the supply network in order to meet supply network utility requirements such as voltage and/or frequency support.

The dc link may include a capacitor. In this case the power converter may further include a current sensor for measuring the current flowing in the capacitor and providing an output signal. The output signal of the current sensor can be subtracted from a signal derived from a signal indicative of the generator power to provide an inferred signal that is added to the output of a dc link voltage controller of the first controller to determine a dc link current demand signal for the first active rectifier/inverter. Alternatively, the output signal of the current sensor can be subtracted from a signal derived from a signal indicative of the generator power to provide a signal that is filtered and added to the output of a dc link voltage controller of the first controller to determine a dc link current demand signal for the first active rectifier/inverter.

Alternatively, the power converter may further include a voltage sensor for measuring the dc link voltage and providing a dc link voltage feedback signal. Means may also be provided for measuring the rate of change of the dc link voltage feedback signal. The integral value of a PI controller of a dc link voltage controller of the first controller can then be modified by a predetermined factor when the dc link voltage feedback signal is greater than a first threshold and the rate of change of the dc link voltage feedback signal is greater than a second threshold.

During a supply network voltage dip situation, a quadrature axis current axis demand signal for the second active rectifier/inverter may be derived from a slew rate limited version of a signal that is derived from the power limit rating of the second active rectifier/inverter that is modified as a function of the prevailing supply network voltage conditions.

The second controller preferably compares the voltage demand signal indicative of the level of voltage to be achieved at the network terminals of the filter to a voltage feedback signal measured at the network terminals of the filter to determine a direct axis current demand signal for the second active rectifier/inverter. The second controller can then control the semiconductor power switching devices of the second active rectifier/inverter to produce filter/supply network electrical quantities that achieve the desired direct axis current for the second active rectifier/inverter.

The second controller can modify the direct axis current demand signal in accordance with the prevailing supply network voltage conditions.

The second controller can modify an error signal arising from the difference between the voltage demand signal indicative of the level of voltage to be achieved at the network terminals of the filter and the voltage feedback signal measured at the network terminals of the filter in accordance with a signal derived from the direct axis current demand signal. The purpose of modifying the error signal in accordance with a signal derived from the direct axis current demand signal is that a characteristic can be realised which can contribute to current sharing between multiple generators which are connected to a particular supply network.

The power converter preferably further comprises a speed sensor for deriving a speed signal indicative of the speed of the moving part of the generator (i.e. the rotor in the case of the rotating generator and the translator in the case of the linear generator). However, in some cases the speed sensor may be replaced by a speed observer system that uses internal signals to the first active rectifier/inverter to derive a speed signal. The speed signal (derived from the speed sensor or the speed observer system) can then be used to derive the power demand signal by reference to a look-up table of power demand signal versus speed. The look-up table may be combined with a PI controller. The speed signal is preferably modified by a filter function. The speed signal may also be modified by a second filter function and multiplied by a gain to provide a damping term, which is added to the power demand signal derived with reference to the look-up table to give a total power demand signal. The filter functions may be used independently or together to dampen any shaft or drive train resonances if applicable.

The present invention also provides an arrangement comprising a plurality of power converters as described above connected together in parallel to a supply network operating at nominally fixed voltage and nominally fixed frequency by a parallel connection. The voltage demand signal indicative of the voltage to be achieved at the network terminals of the filter of each power converter is preferably derived from a comparison of a top-level voltage demand signal and a top-level voltage feedback signal that is measured at the point where the parallel connection is connected to the supply network.

Each individual power converter preferably includes a step-up transformer electrically connected between the associated filter and the parallel connection. The arrangement may also include a step-up transformer electrically connected between the parallel connection and the supply network. The top-level voltage feedback signal can be measured at either the supply network side or the parallel connection side of the step-up transformer electrically connected between the parallel connection and the supply network. The advantage of measuring the top-level voltage feedback signal on the supply network side of the step-up transformer is that the measurement on the parallel connection side is subject to regulation across the step-up transformer. This regulation effect is therefore eliminated if the measurement is made on the supply network side.

The power converter is suitable for use in a wind turbine. The present invention therefore also provides a wind turbine comprising a generator having a stator and a rotor, a turbine assembly including a turbine blade or turbine blades for rotating the rotor of the generator, and a power converter as described above. The turbine assembly can be integral with the rotor of the generator. Alternatively, the blade or blades of the turbine (three blades might be typical) is mounted to a rotatable shaft and the rotor of the generator is coupled to the rotatable shaft. The rotor of the generator can be coupled directly to the rotatable shaft or indirectly through a gearbox.

A plurality of wind turbines can be connected together to form a wind farm. The present invention therefore further provides a wind farm comprising a supply network operating at nominally fixed voltage and nominally fixed frequency, and a plurality of wind turbines as described above. The respective power converters of the plurality of wind turbines are connected together in parallel to the supply network by a parallel connection and the voltage demand signal indicative of the voltage to be achieved at the network terminals of the filter of each power converter is derived from a comparison of a top-level voltage demand signal and a top-level voltage feedback signal that is measured at the point where the parallel connection is connected to the supply network.

Each individual wind turbine preferably includes a step-up transformer electrically connected between the filter of the associated power converter and the parallel connection. The wind farm may further comprise a step-up transformer electrically connected between the parallel connection and the supply network. The top-level voltage feedback signal can be measured at either the supply network side or the parallel connection side of the step-up transformer electrically connected between the parallel connection and the supply network.

The present invention further provides a method of operating a power converter that can be used to interface a generator that provides variable voltage at variable frequency to a supply network operating at nominally fixed voltage and nominally fixed frequency, the power converter comprising:
  a first active rectifier/inverter electrically connected to the stator of the generator and including a plurality of semiconductor power switching devices;
  a second active rectifier/inverter including a plurality of semiconductor power switching devices;
  a dc link connected between the first active rectifier/inverter and the second active rectifier/inverter;
  a filter connected between the second active rectifier/inverter and the supply network, the filter including network terminals;
  a first controller for the first active rectifier/inverter; and
  a second controller for the second active rectifier/inverter;
  wherein the method comprises the steps of:
    the first controller using a dc link voltage demand signal indicative of a desired dc link voltage to control the semiconductor power switching devices of the first active rectifier/inverter to achieve the desired level of dc link voltage that corresponds to the dc link voltage demand signal; and
    the second controller using a power demand signal indicative of the level of power to be transferred from the dc link to the supply network through the second active rectifier/inverter, and a voltage demand signal indicative of the voltage to be achieved at the network terminals of the filter to control the semiconductor power switching devices of the second active rectifier/inverter to achieve the desired levels of power and voltage that correspond to the power and voltage demand signals.

The method may include further steps as outlined below.

The second controller may use a measure of the supply network voltage to determine limits on the power that can be exported from the second active rectifier/inverter when the supply network voltage deviates from its nominal condition.

The second controller may also use a measure of the supply network voltage to determine the level of current that is to be provided from the second active rectifier/inverter to provide voltage support to the supply network when the supply network voltage deviates from its nominal condition.

The first controller may use a flux demand signal indicative of a desired level of flux to be achieved in the generator, convert the flux demand signal to a direct axis current demand signal for the first active rectifier/inverter and control the semiconductor power switching devices of the first active rectifier/inverter to produce stator electrical quantities that achieve the desired direct axis current for the first active rectifier/inverter. The step of converting the flux demand signal to the direct current axis demand signal can be carried out with reference to one or more characteristics of the generator.

The first controller may compare the dc link voltage demand signal indicative of a desired dc link voltage to a dc link voltage feedback signal to determine a quadrature axis current demand signal for the first active rectifier/inverter and control the semiconductor power switching devices of the first active rectifier/inverter to produce stator electrical quantities that achieve the desired quadrature axis current for the first active rectifier/inverter.

The second controller may supply a control signal that varies in accordance with the prevailing supply network voltage conditions to the first controller during a supply network voltage dip situation. The first controller can compare the dc link voltage demand signal indicative of a desired dc link voltage to the dc link voltage feedback signal to determine a dc link current demand signal and limit the dc link current demand signal using the control signal from the second controller to determine a limited dc link current demand signal. The first controller can then use the limited dc link current demand signal to determine the quadrature axis current demand signal for the first active rectifier/inverter so that no power is drawn from the supply network during the supply network voltage dip situation.

Alternatively, the second controller may supply a control signal that varies in accordance with the prevailing supply network voltage conditions and/or the power demand signal to the first controller. A dc link voltage controller of the first controller may then compare the dc link voltage demand signal indicative of a desired dc link voltage to the dc link voltage feedback signal to provide an output signal that is added to the control signal to determine a dc link current demand signal. The dc link current demand signal may then be used to determine the quadrature axis current demand signal for the first active rectifier/inverter.

The second controller may convert the power demand signal indicative of the level of power to be transferred from the dc link to the supply network through the second active rectifier/inverter to a quadrature axis current demand signal for the second active rectifier/inverter and control the semiconductor power switching devices of the second active rectifier/inverter to produce filter/supply network electrical quantities that achieve the desired quadrature axis current for the second active rectifier/inverter.

The above step of converting the power demand signal to the quadrature axis current demand signal may be carried out by dividing the power demand signal by a signal that is derived from the voltage at the network terminals of the filter. Alternatively, the power demand signal may be converted into the quadrature axis current demand signal by dividing the power demand signal by a filtered version of the signal that is derived from the voltage at the network terminals of the filter.

The second controller may use a further dc link voltage demand signal indicative of a desired dc link voltage, compare the further dc link voltage demand signal to the dc link voltage feedback signal to determine an unlimited quadrature axis current demand signal and limit the unlimited quadrature axis current demand signal to a value determined by a limiting signal that is derived from the power demand signal to determine the quadrature axis current demand signal for the second active rectifier/inverter during start-up and the normal operating condition of the power converter.

The method can further comprise the step of adding the unlimited quadrature axis current demand signal to a quadrature axis current feedforward signal that is derived from the following signals: a signal indicative of the generator power, a voltage feedback signal measured at the network terminals of the filter and a gain signal that varies in accordance with the prevailing supply network voltage conditions.

The signal indicative of the generator power can be supplied to the second controller from the first controller. Alternatively, the signal indicative of the generator power minus the output of a PI controller of a dc link voltage controller of the first controller can be supplied to the second controller and is used by the second controller only during a supply voltage dip situation.

The second controller may modify the limiting signal that is derived from the power demand signal in accordance with the prevailing supply network voltage conditions in a supply network voltage dip situation. The use of the word "dip" in this description in relation to supply network dip situations refers to a situation where the supply network voltage is reduced below its nominal value as a result of either symmetrical or asymmetrical network fault conditions.

The dc link may include a capacitor and the power converter may further include a current sensor for measuring the current flowing in the capacitor and providing an output signal. In this case, the method can further comprise the steps of subtracting the output signal of the current sensor from a signal derived from a signal indicative of the generator power to provide an inferred signal that is added to the output of a dc link voltage controller of the first controller to determine a dc link current demand signal for the first active rectifier/inverter. Alternatively, the method can further comprise the steps of subtracting the output signal of the current sensor from a signal derived from a signal indicative of the generator power to provide a signal that is filtered and added to the output of a dc link voltage controller of the first controller to determine a dc link current demand signal for the first active rectifier/inverter.

Alternatively, the power converter may further include a voltage sensor for measuring the dc link voltage and providing a dc link voltage feedback signal and means for measuring the rate of change of the dc link voltage feedback signal. In this case, the method can further comprise the steps of modifying the integral value of a PI controller of a dc link voltage controller of the first controller by a predetermined factor when the dc link voltage feedback signal is greater than a first threshold and the rate of change of the dc link voltage feedback signal is greater than a second threshold.

In a supply network voltage dip situation, a quadrature axis current axis demand signal for the second active rectifier/inverter can be derived from a slew rate limited version of a signal derived from the power limit rating of the second active rectifier/inverter that is modified as a function of the prevailing supply network voltage conditions.

The second controller may compare the voltage demand signal indicative of the level of voltage to be achieved at the network terminals of the filter to a voltage feedback signal measured at the network terminals of the filter to determine a direct axis current demand signal for the second active rectifier/inverter and control the semiconductor power switching devices of the second active rectifier/inverter to produce filter/supply network electrical quantities that achieve the desired direct axis current for the second active rectifier/inverter.

The second controller may modify the direct axis current demand signal in accordance with the prevailing supply network voltage conditions.

The second controller may modify an error signal arising from the difference between the voltage demand signal indicative of the level of voltage to be achieved at the network terminals of the filter and the voltage feedback signal measured at the network terminals of the filter in accordance with a signal derived from the direct axis current demand signal.

A speed signal indicative of the speed of the moving part of the generator may be derived and used to derive the power demand signal. The speed signal may be modified by one or more filter functions, which may also be used to provide damping of any shaft or drive train resonances.

The power demand signal can be derived from a look-up table or mathematical function where the modified speed signal forms a pointer to the look-up table or a value for which the mathematical function is calculated. The power demand signal may also be summed with a signal derived from a filtered version of the speed signal.

The present invention also provides a method of operating a plurality of power converters as described above connected together in parallel to a supply network operating at nominally fixed voltage and nominally fixed frequency by a parallel connection, the method comprising the step of deriving the voltage demand signal indicative of the voltage to be achieved at the network terminals of the filter of each power converter from a comparison of a top-level voltage demand signal and a top-level voltage feedback signal that is measured at the point where the parallel connection is connected to the supply network. The method may also comprise the step of measuring the top-level voltage feedback signal at either the supply network side or the parallel connection side of the step-up transformer electrically connected between the parallel connection and the supply network.

The present invention also provides a method of operating a wind turbine comprising a generator that provides variable voltage at variable frequency and has a stator and a rotor, a turbine assembly including at least one blade for rotating the rotor of the generator, and a power converter that interfaces the generator to a supply network operating at nominally fixed voltage and nominally fixed frequency, the power converter comprising:

a first active rectifier/inverter electrically connected to the stator of the generator and including a plurality of semiconductor power switching devices;

a second active rectifier/inverter including a plurality of semiconductor power switching devices;

a dc link connected between the first active rectifier/inverter and the second active rectifier/inverter;

a filter connected between the second active rectifier/inverter and the supply network, the filter including network terminals;

a first controller for the first active rectifier/inverter; and a second controller for the second active rectifier/inverter;

wherein in response to a change in wind speed method comprises the steps of:

controlling the second active rectifier/inverter to change the level of power exported out of the dc link such that the dc link voltage changes from a desired level; and controlling the first active rectifier/inverter to import sufficient current into the dc link through the generator bridge from the generator to restore the dc link voltage to the desired level.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Power Converter Topology

Figure 1:
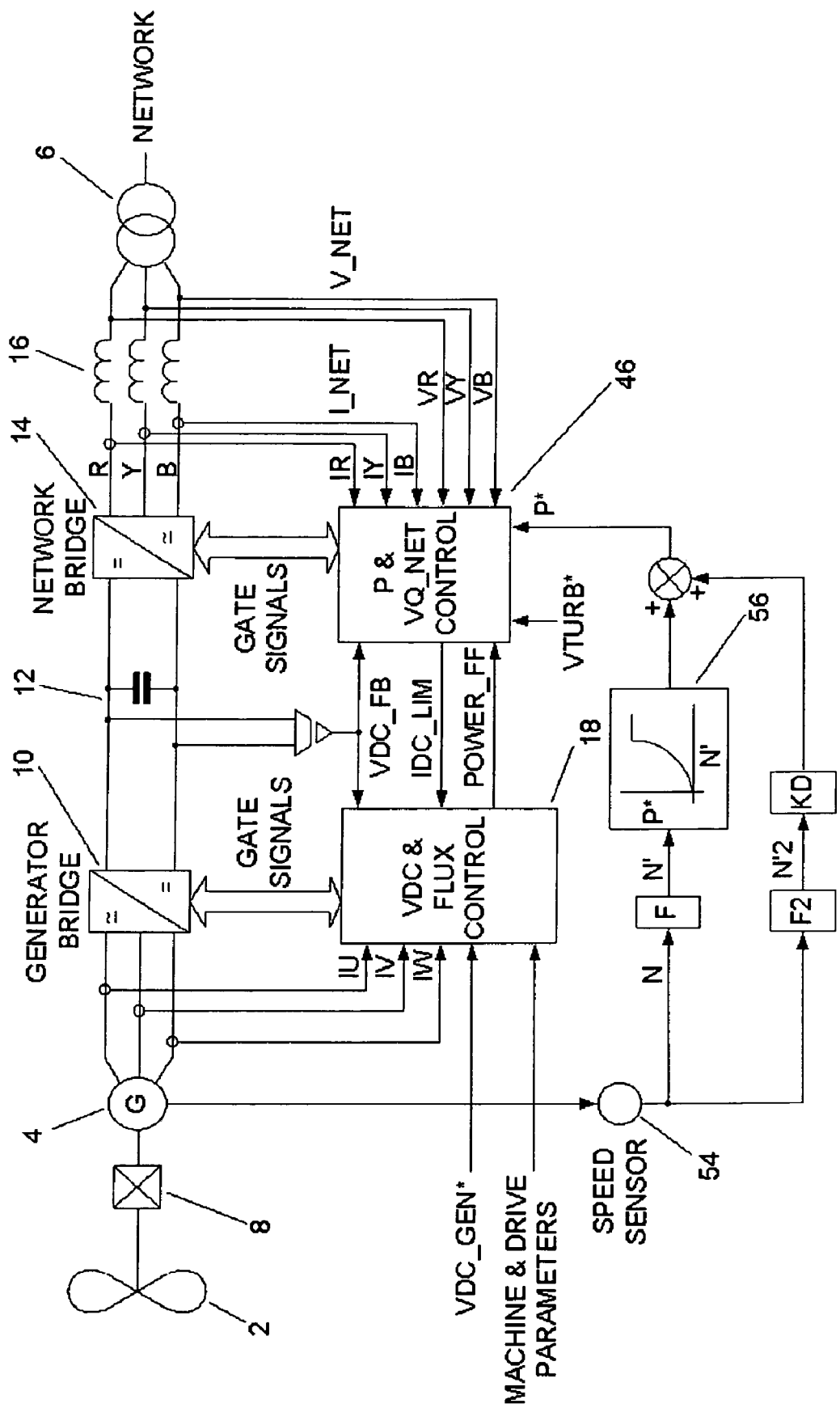
FIG. 1 is a schematic drawing showing how a power converter according to the present invention is used to interface between a wind turbine driving a variable speed generator and a fixed frequency power network.

The basic topology of the power converter will be outlined with reference to FIG. 1.

The power converter is used to interface between a wind turbine 2 driving a variable speed ac induction generator 4 and a nominally fixed frequency power network (labelled NETWORK). The wind turbine typically includes three turbine blades (one turbine blade or two turbine blades or more than three turbine blades are also possible) mounted on a rotating shaft and whose pitch can be controlled by means of a pitch actuator in order to optimise and/or limit the capture of wind energy into the generator 4. A gearbox 8 is used to connect the rotating shaft to the rotor of the variable speed generator 4. In some cases, the rotating shaft can be connected directly to the rotor of the variable speed generator. This means that the speed of rotation of the rotor varies as a function of the wind speed and that the frequency of the voltage developed at the stator of the generator 4 (the "stator frequency") may therefore vary over wide ranges. A number of wind turbines as represented by the entirety of FIG. 1 can be connected together to define a wind farm.

The terminals of the generator 4 are connected to the ac terminals of a three-phase generator bridge 10 which in normal operation operates as an active rectifier to supply power to a dc link 12. The generator bridge 10 has a conventional three-phase two-level topology with a series of semiconductor power switching devices fully controlled and regulated using a pulse width modulation strategy. However, in practice the generator bridge 10 can have any suitable topology such a three-level neutral point clamped topology or a multi-level topology (Foch-Maynard arrangement, for example). The derivation of the gate drive command signals that are used to control the semiconductor power switching devices is described in more detail below.

The dc output voltage of the generator bridge 10 is fed to the dc terminals of a network bridge 14 which in normal operation operates as an inverter. The principle control for the dc output voltage is achieved by controlling the generator bridge 10. The network bridge 14 has a similar three-phase two-level topology to the generator bridge 10 with a series of semiconductor power switching devices fully controlled and regulated using a pulse width modulation strategy. However, in practice the network bridge 14 can have any suitable topology, as discussed above for the generator bridge 10. The network bridge 14 is controlled to meet two principle objectives, namely active power and network voltage. A detailed description of how this control is achieved is provided below. The derivation of the gate drive command signals that are used to control the semiconductor power switching devices is also described in more detail below.

As described herein, active rectification (as the prime mode of operation of the generator bridge 10) is the conversion of energy from the ac terminals of the three-phase generator bridge to the dc link and inversion (as the prime mode of operation of the network bridge 14) is the conversion of energy from the dc link of the three-phase network bridge to its ac terminals. However, it will be readily appreciated that there may be times when it might be necessary or desirable to operate the generator bridge 10 as an inverter and operate the network bridge 14 as an active rectifier. For example, during start-up the network bridge 14 will operate as an active rectifier to supply power from the supply network to the dc link 12. In situations where a network voltage dip occurs, the generator bridge 10 may operate in either an active rectifier mode or in an inverter mode as required in order to control the voltage of the dc link 12. The action of controllers for the generator bridge 10 and the network bridge 14 (that is the generator bridge controller 18 and the network bridge controller 46 described in more detail below) is coordinated in the event of a network voltage dip such that power is not drawn from the supply network but, subject to the parameterisation and the level of the voltage dip, the power converter is still capable of supplying power to the supply network.

It can also be advantageous for maintenance purposes and when the wind turbine is operating at very low speeds to operate the generator 4 in a motoring mode. In this case, power can be supplied from the supply network to the generator 4 through the network bridge 14 operating as an active rectifier and the generator bridge 10 operating as an inverter.

The ac output voltage of the network bridge 14 is filtered by inductors 16 (and possible other filters) and supplied to the nominally fixed frequency power network via a step-up transformer 6. Protective switchgear (not shown) can be included to provide a reliable connection to the power network and to isolate the generator system from the power network for various operational and non-operational requirements.

Wind Farm Topology

Figure 6:
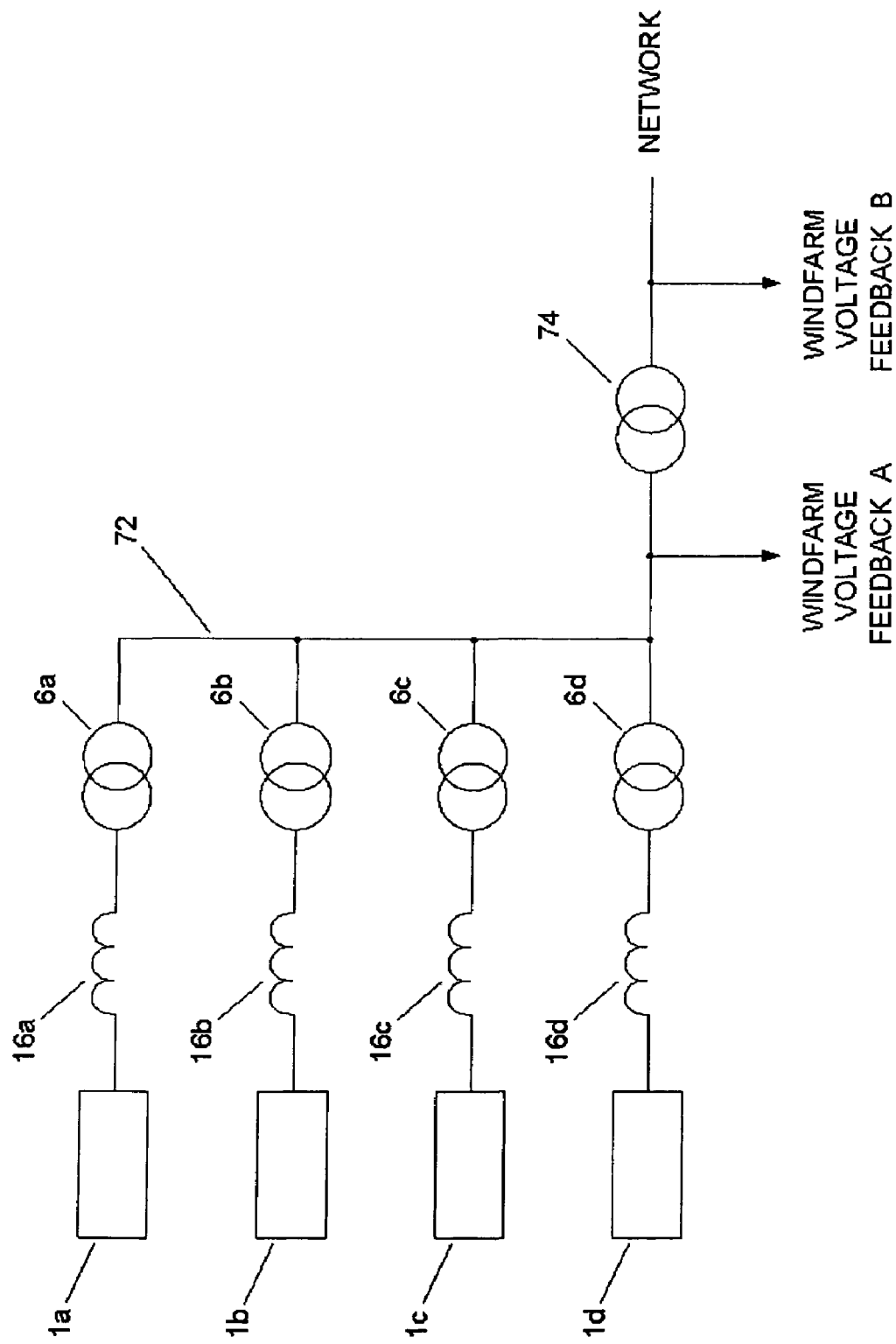
FIG. 6 is a schematic drawing showing how a number of power converters according to the present invention can be connected together in parallel to the supply network to form a wind farm.

As mentioned briefly above, a number of wind turbines as represented by the entirety of FIG. 1 can be connected together to define a wind farm. This is shown schematically in FIG. 6 where a number of power converters 1a to 1d are connected to the nominally fixed frequency supply network (labelled NETWORK) by a parallel connection 72. Each power converter 1a to 1d includes a filter 16a to 16d and a step-up transformer 6a to 6d. An additional wind farm step-up transformer 74 is also provided between the parallel connection 72 and the supply network. FIG. 6 shows how the wind farm voltage feedback signal that is described in more detail below with reference to FIG. 7 can be measured at the parallel connection side (labelled WINDFARM VOLTAGE FEEDBACK A) or the supply network side (labelled WINDFARM VOLTAGE FEEDBACK B) of the wind farm step-up transformer 74. The advantage of measuring the top-level voltage feedback signal on the supply network side of the wind farm step-up transformer 74 is that the measurement on the parallel connection side is subject to regulation across the step-up transformer. This regulation effect is therefore eliminated if the measurement is made on the supply network side. Alternatively, the measurement of the wind farm voltage feedback signal at the supply network side can be calculated using the measurement of the wind farm voltage feedback signal at the parallel connection side, the characteristics of the wind farm step-up transformer 74 and the amplitude and angle of the current through the wind farm step-up transformer.

Generator Bridge Control

The control of the generator bridge 10 will now be explained with reference to FIGS. 1 to 3.

Figure 2:
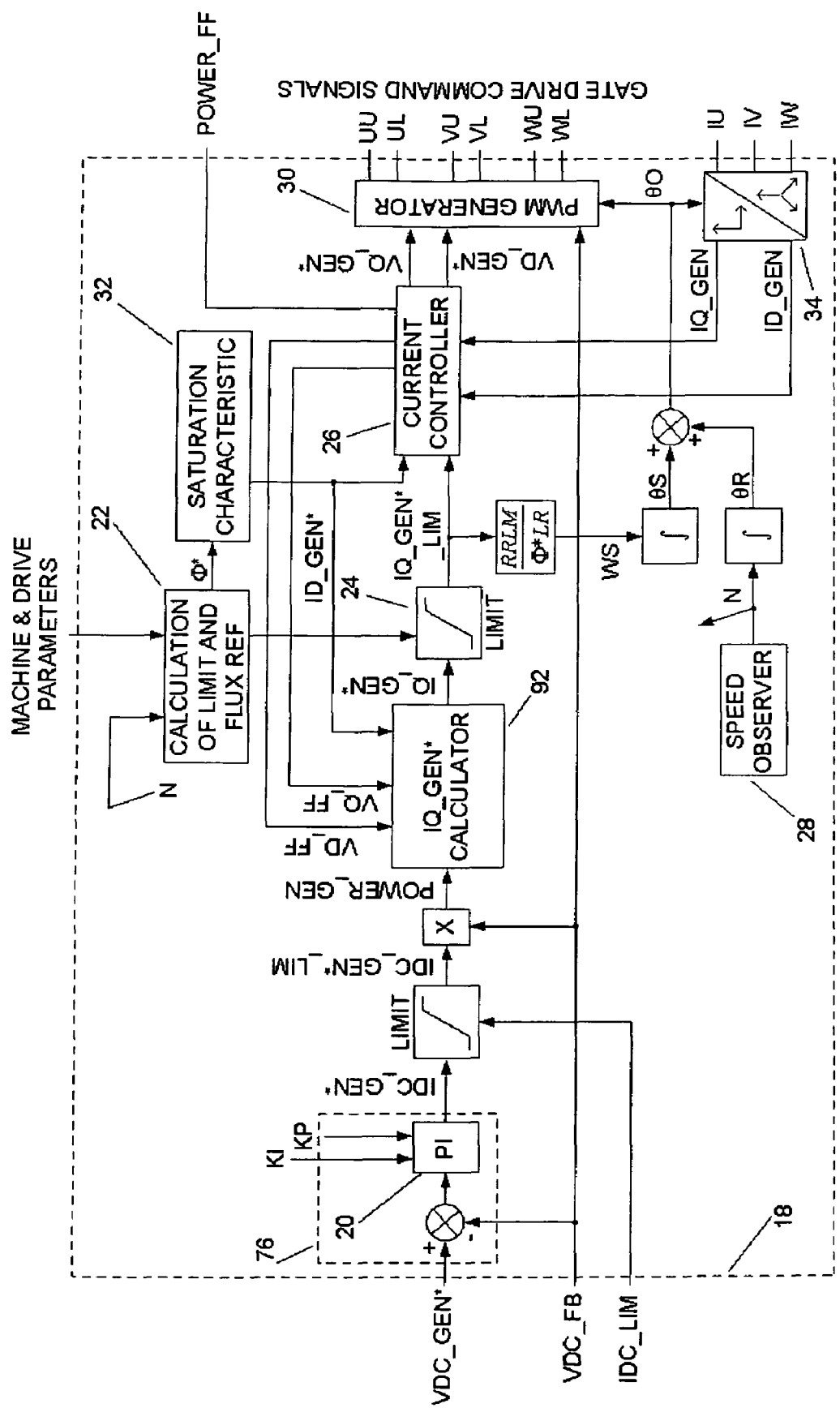
FIG. 2 is a schematic drawing showing more detail of the dc link control for the generator bridge (active rectifier) of FIG. 1.

A generator bridge controller 18 receives a dc link voltage demand signal VDC_GEN* and a voltage feedback signal VDC_FB indicative of the dc link voltage. VDC_FB is subtracted from VDC_GEN* and the difference is supplied to a PI controller 20 with variable integral gain Ki and proportional gain Kp inputs to provide a dc link current demand signal IDC_GEN* that is the effective current required to flow in the dc link 12 to satisfy the prevailing operational conditions. This dc link current demand signal IDC_GEN* is then limited during grid fault conditions by a signal IDC_LIM supplied from the network bridge controller 46 (see below) to form a signal IDC_GEN*_LIM. To convert the limited dc link current demand signal IDC_GEN*_LIM into a quadrature axis current demand signal IQ_GEN* relating to the generator phase current then the limited dc link current demand signal IDC_GEN*_LIM is first multiplied by the voltage feedback signal VDC_FB to provide a power signal POWER_GEN. The power signal POWER_GEN is then converted in the IQ_GEN* calculator function block 92 to the quadrature axis current demand signal IQ_GEN* by applying the following formula:

$$IQ\_GEN^* = \frac{\left(\frac{POWER\_GEN}{\sqrt{3}}\right) - (VD\_FF \times ID\_GEN^*)}{VQ\_FF}$$

where VD_FF is the feedforward component of the direct voltage within a current controller 26 of FIG. 2, ID_GEN* is the direct axis demand current supplied from a saturation characteristic function block 32 and VQ_FF is the feedforward component of the quadrature axis voltage within the current controller 26.

The quadrature axis current demand signal IQ_GEN* is constrained by a limit function to remain within the non-breakout region of the generator characteristic and the voltage and current ratings of the generator and network bridges. This limit is determined by an off-line calculation to create a look-up table embedded in the functional block 22 based on machine equivalent circuit parameters, drive rating parameters and required operational speed range. The resulting look-up table is used during the operation of the power converter by accessing it with a rotor speed feedback signal N (or an observed rotor speed signal) and taking the resulting signal as the limit value for the IQ_GEN* limit function block 24. The resulting limited quadrature axis current demand signal IQ_GEN*_LIM is then supplied to a current controller 26 (described in more detail below). The limited quadrature axis current demand signal IQ_GEN*_LIM is also used to determine the slip frequency WS that is to be applied to the generator 4 to achieve the necessary power flow from the generator to the dc link 12. The slip frequency WS is determined using the following function:

$$WS = \frac{IQ\_GEN^*\_LIM \times RR \times LM}{\Phi^* \times LR}$$

Where RR is the rotor resistance, LM is the magnetising inductance, Φ* is the generator flux demand signal and LR is the rotor leakage inductance.

Integrating the slip frequency WS provides an output θS, which is the slip angle. Integrating the output from a speed observer 28 provides θR, which is the observed rotor angle. (The observer function 28 can be replaced by direct measurement of the rotor position by the use of an incremental encoder or similar device.) A rotor flux angle θ0 can then be determined by summing the slip angle θS and the rotor angle θR. The rotor flux angle θ0 is the angle at which the combination of the direct axis voltage VD and the quadrature axis voltage VQ are to be applied at the stator terminals of the generator 4 by means of a pulse width modulation generator 30. This is described in more detail below. It should be noted that for synchronous generators the step of defining and integrating slip frequency is not required.

The generator flux demand signal Φ* (which can be constant or variable depending on the required system characteristics) is applied to a function block 32 containing the saturation characteristic of the generator magnetising inductance. The saturation characteristic is determined either by direct measurement when the generator is commissioned or by extracting data from the factory test results for the generator. The output of the saturation characteristic function block 32 is a magnetising current signal and becomes the direct axis current demand signal ID_GEN* applied to the current controller 26. For synchronous generators, the direct axis current demand signal is determined by the generator terminal voltage requirements for each speed and load condition. By adjusting the direct axis current demand signal to a synchronous generator the excitation can be modified by the action of the generator bridge 10 to optimise the terminal voltage and the overall generator efficiency for each operational condition.

The current controller 26 for the generator bridge 10 includes two regulators, one operating in the direct current axis and one operating in the quadrature current axis. Overall, the current controller 26 operates in a synchronous reference frame aligned with the rotor flux angle. FIG. 3 shows the overall direct and quadrature axis current regulators of the generator bridge 10.

In addition to the limited quadrature axis current demand signal IQ_GEN*_LIM and the direct axis current demand signal ID_GEN*, the current controller 26 is also supplied with a quadrature axis current feedback signal IQ_GEN and a direct axis current feedback signal ID_GEN that are derived from the measurement of the generator phase currents IU, IV and IW. The conversion from three-phase components in a stationary reference frame to direct/quadrature components in a synchronous reference frame is achieved using a combined Clarke/Park transform block 34. The transform uses the rotor flux angle θ0 for the conversion. It can be seen from FIG. 3 that the current controller 26 also receives the following additional signals: the generator flux demand signal Φ* (which can be constant or variable depending on the required system characteristics) and the generator stator frequency W0. The stator frequency W0 is calculated from the sum of the slip frequency and the rotor frequency. Rotor frequency is derived from the observed rotor speed and the pole number of the generator.

The current controller 26 operates by comparing the direct axis current demand signal ID_GEN* with the direct axis current feedback signal ID_GEN and the limited quadrature axis current demand signal IQ_GEN*_LIM with the quadrature axis current feedback signal IQ_GEN and applying the resulting errors to independent PI controllers. The outputs from the PI controllers are then summed with cross-coupling signals derived from the product of current demands and machine parameters to produce a total output voltage for the direct and quadrature axes, VD_GEN* and VQ_GEN* respectively. The cross-coupling terms are shown in FIG. 3 and emulate the standard voltage equations for the generator 4 in the steady state. With reference to the cross-coupling terms, δLS is the generator stator leakage inductance and RS is the generator stator resistance.

The final voltage outputs from the current controller 26, VD_GEN* and VQ_GEN* are converted from Cartesian to polar co-ordinates using a co-ordinate converter 38. The total voltage magnitude V_GEN* is calculated according to the equation:

$$V\_GEN^* = \sqrt{(VD\_GEN^{*2} + VQ\_GEN^{*2})}$$

and supplied to the gate drive command signal controller 36. The angle between the total voltage magnitude V_GEN* and the quadrature axis voltage VQ_GEN* is θ_GEN and is calculated from the arctangent of VD_GEN*/VQ_GEN* as follows:

$$\theta\_GEN = \arctan\left(\frac{VD\_GEN^*}{VQ\_GEN^*}\right)$$

The angle θ_GEN between the total voltage magnitude V_GEN* and the quadrature axis voltage VQ_GEN* is added to the rotor flux angle θ0 to determine the angle at which the total voltage is to be impressed on the stator terminals of the generator 4.

The individual upper (U) and lower (L) gate drive command signals for the three-phases U, V and W resulting in individual signals UU, UL, VU, VL, WU and WL of the generator bridge 10 are calculated in the pulse width modulation (PWM) generator 30 using the total voltage magnitude V_GEN*, the sum of the angles θ_GEN and θ0 and the pulse width modulation frequency. The dc link voltage feedback signal VDC_FB is also factored into these PWM calculations. The dc link voltage feedback signal VDC_FB can be derived independently when independent controllers are used for the generator bridge 10 and the network bridge 14, respectively. This is particularly necessary when the generator bridge 10 and the network bridge 14 are physically remote from each other and a significant inductance exists between the dc link capacitance of each bridge. In situations where an independently-derived dc link voltage feedback signal is provided for each bridge then it will be readily appreciated that the following substitution should be made:

For the generator bridge 10: VDC_FB=VDC_FB_GEN

For the network bridge 14: VDC_FB=VDC_FB_NET

The current controller 26 also produces a power feedforward signal indicative of the generator power POWER_FF, which is calculated as follows:

POWER_FF=
√3(VQ_GEN*×IQ_GEN+VD_GEN*×ID_GEN)

This is used as a feedback signal to the network bridge controller 46.

Network Bridge Control

The control of the network bridge 14 will now be explained with reference to FIGS. 1 and 4 to 7. The control is based on a voltage control scheme and is different from the power factor angle control scheme and reactive power control scheme used in the conventional power converters described above.

Figure 7:
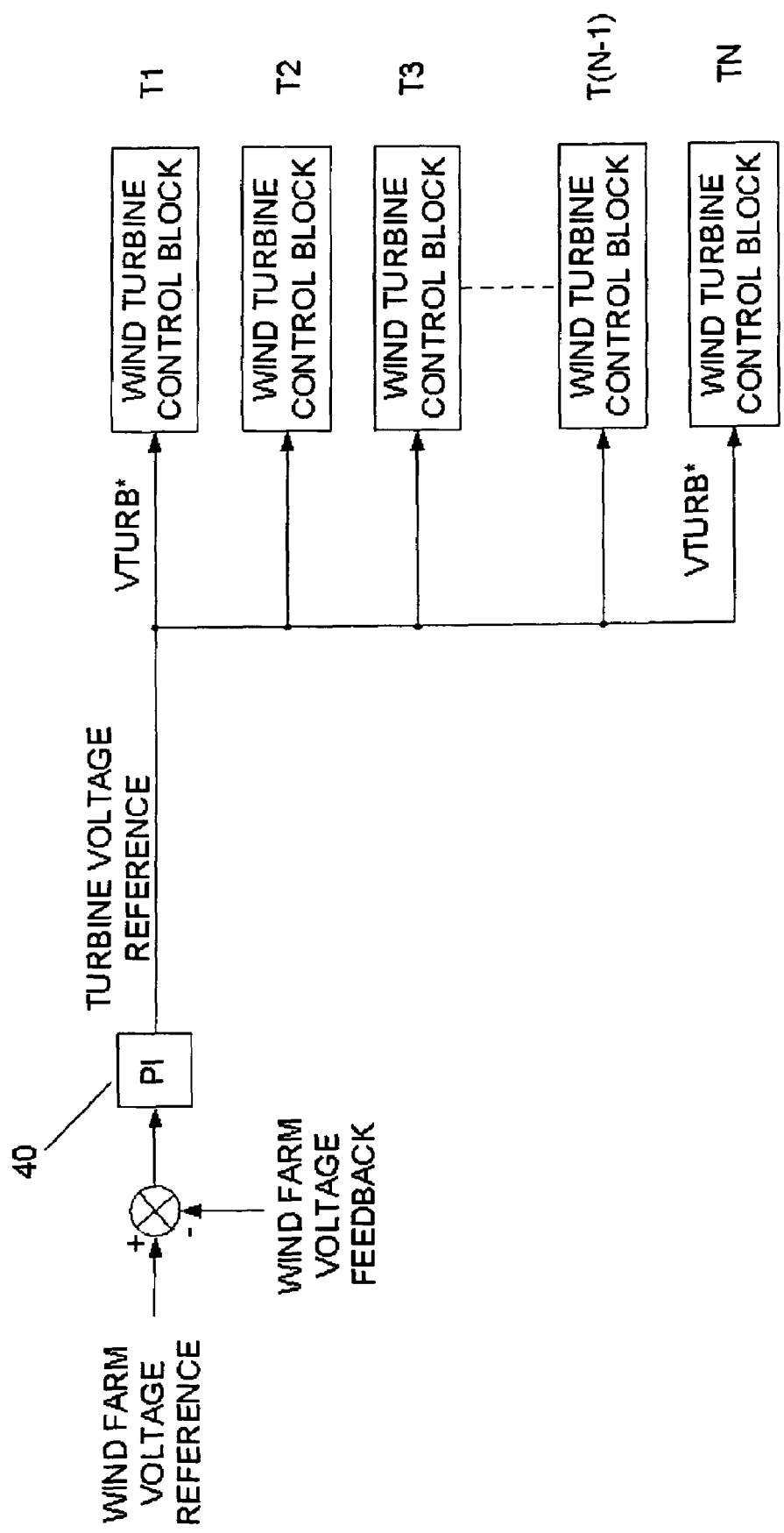
FIG. 7 is a schematic drawing showing an overall wind farm voltage control.

The voltage control scheme includes two levels of control. With reference to FIG. 7, the first is defined at the wind farm level and is responsive to a wind farm voltage demand signal that is typically set by the utility company who controls the wind farm. This wind farm voltage demand signal is compared to a wind farm voltage feedback signal and the error between the two signals is applied to a proportional plus integral controller 40 to define a turbine voltage demand signal VTURB* that is transmitted to all of the wind turbines T1 to TN in the wind farm. A second level of control is then applied to each of the individual wind turbines to regulate its own output voltage in response to the turbine voltage demand signal VTURB*.

Figure 4:
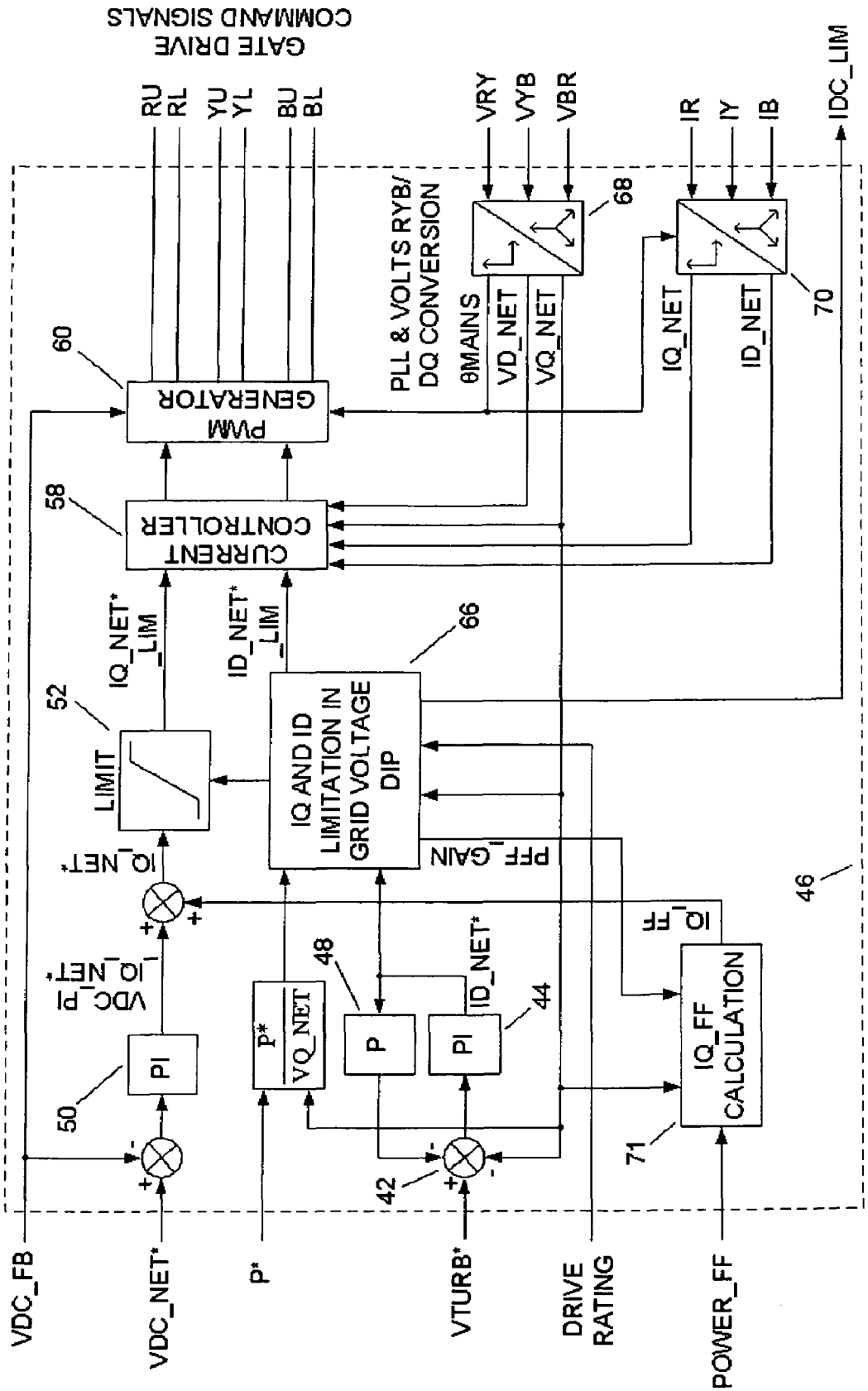
FIG. 4 is a schematic drawing showing more detail of the power control for the network bridge (inverter) of FIG. 1.

With reference to FIG. 4, in each of the wind turbines of the wind farm, the turbine voltage demand signal VTURB* is compared in a summing node 42 to a quadrature axis voltage subordinate feedback signal VQ_NET (see below) that is derived from three phase-voltage measurement on the network side of the inductors 16. The difference between the two signals is fed to a PI controller 44 to form a reactive current demand signal ID_NET* that is supplied via a limitation block 66 to a current controller 58 described in more detail below.

The reactive current demand signal ID_NET* is also fed back through a proportional gain controller 48 to the summing node 42 to further modify the voltage difference signal. This serves to provide a droop characteristic, such that when multiple wind turbines are connected together in parallel to a wind farm transformer through different connecting impedances, the reactive current sharing between each wind turbine is more balanced. The droop gain can be adjusted depending on site network configurations to give adequate current balance between the wind turbines and to respect rating limitations. Limits are applied to the direct and quadrature axis current demand signals ID_NET* and IQ_NET*, respectively, as described below for network voltage dip situations.

The voltage control scheme is integrated with the network bridge controller 46 as follows. The network bridge controller 46 has five principle input signals and seven principle feedback signals and uses these to derive gate drive command signals to control the operation of the semiconductor power switching devices in the network bridge 14.

The input signals include a dc link voltage demand signal for the network bridge VDC_NET*, a power export demand signal P*, the turbine voltage demand signal VTURB*, a parameter DRIVE RATING defining the drive current rating and the power feedforward signal POWER_FF supplied from the generator bridge controller 18 and which is indicative of the generator power. The feedback signals include three phase voltage measurements VRY, VYB and VBR (that is the voltage measurements taken across the so-called red (R), yellow (Y) and blue (B) output lines that supply power from the network bridge 14 to the network), three phase current measurements IR, IY and IB, and the voltage feedback signal VDC_FB indicative of the dc link voltage. The feedback signals are used to derive the following voltage and current subordinate feedback signals for the network bridge 14 in the direct and quadrature axes: VD_NET, VQ_NET, ID_NET and IQ_NET. In addition, a control signal IDC_LIM is passed from the network bridge controller 46 to the generator bridge controller 18 to permit fast power reduction and coordinated control between the controllers during grid fault conditions. During such grid fault conditions, the dc link voltage control is distributed between the network and generator bridges such that no active power is drawn from the supply network and the required supply network voltage support and power export requirements are achieved.

Function block 68 incorporates a phase locked loop (PLL) system to derive the signal θMAINS, which is a measure of the network voltage angle.

The dc link voltage demand signal VDC_NET* is only needed to meet start-up requirements, to maintain connection with the network during zero wind conditions and permit fast coordinated control of the dc link voltage between the generator bridge controller 18 and the network bridge controller 46 during grid fault conditions. In operation, the voltage feedback signal VDC_FB is subtracted from the dc link voltage demand signal VDC_NET* and the result is applied to a PI controller 50 to determine the signal VDC_PI_IQ_NET*. A signal IQ_FF indicative of the quadrature axis network current required to export the instantaneous generator power is calculated in function block 71 from the power feedforward signal POWER_FF, a signal representing the network voltage VQ_NET and a gain signal PFF_GAIN that is an output of the limitation block 66. This is then added to the signal VDC_PI_IQ_NET* to create an unlimited signal IQ_NET*. The resulting signal is constrained by a limit function (limit function block 52) driven by the lesser of P*/VQ_NET or the limit derived from the network voltage dip requirements.

With reference to FIG. 1, the rotor speed feedback signal N is derived from a speed sensor 54 (or alternatively from an observed rotor speed signal) and then filtered to provide a first filtered speed signal N' and a second filter speed signal N'2. The second filtered speed signal N'2 provides damping for any shaft resonance via a damping gain KD. The first filtered speed signal N' provides a pointer to a pre-calculated look-up table 56 of power demand versus filtered speed. The look-up table may be combined with a PI controller. The resulting power export demand signal P*, which is the sum of the damping and look-up table power demand signals, is applied to the network bridge controller 46 as shown in FIG. 1. More particularly, the power export demand signal P* is divided by the quadrature axis voltage subordinate feedback signal VQ_NET to become the limiting signal for the quadrature axis current demand signal IQ_NET* under normal operating conditions. Alternatively, the power export demand signal P* may be converted into the quadrature axis current demand signal IQ_NET* by dividing the power export demand signal P* by a filtered version of the quadrature axis voltage subordinate feedback signal VQ_NET that is derived from the voltage at the network terminals of the inductors 16.

Figure 5:
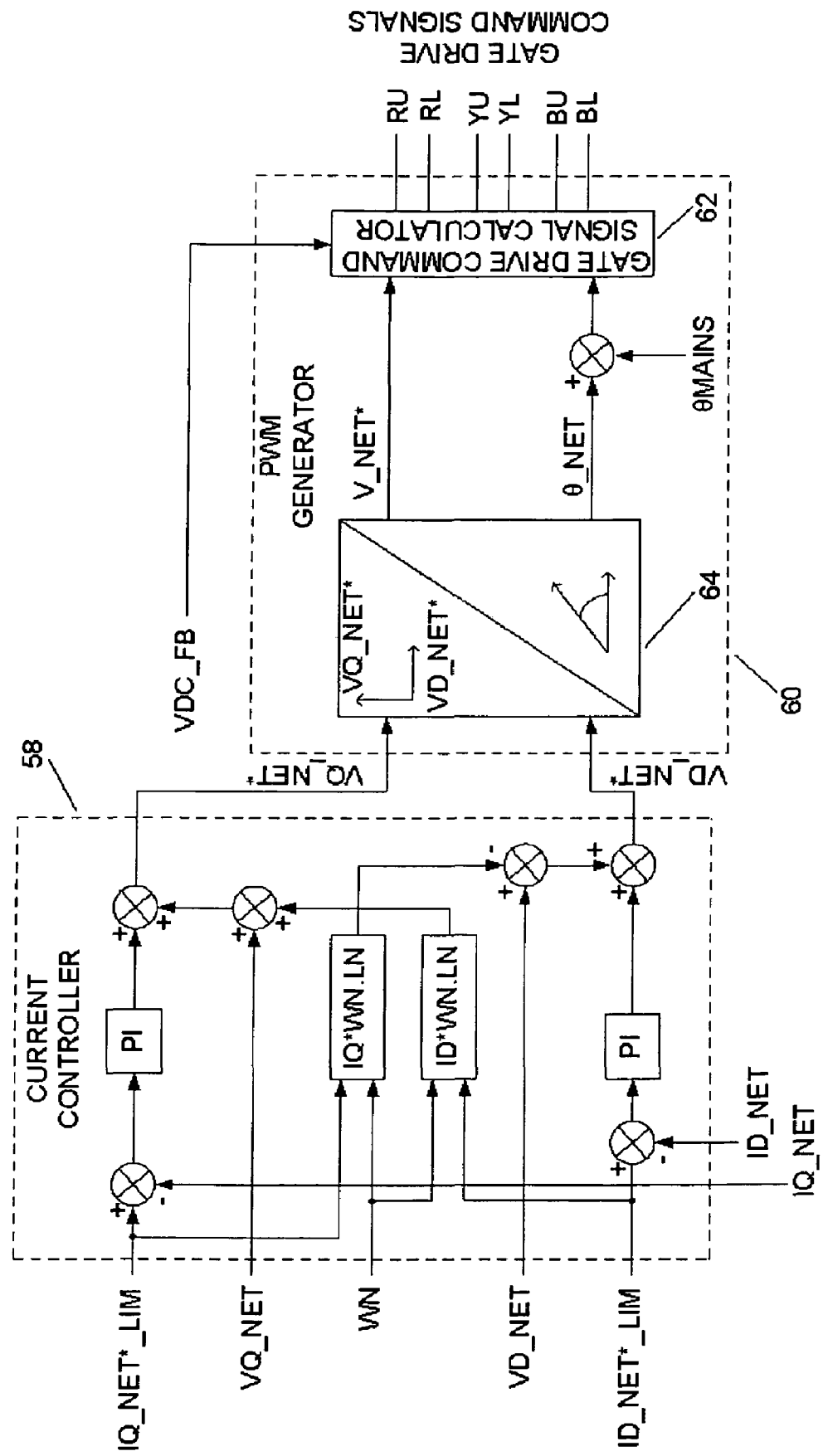
FIG. 5 is a schematic drawing showing more detail of the current control of the network bridge (inverter) of FIG. 1.

The limited quadrature current requirement signal IQ_NET*_LIM (that is the output of the limit function block 52) is the input to a current controller 58. The current controller 58 for the network bridge 14 includes two regulators, one operating in the direct axis and one operating in the quadrature axis. Overall, the current controller 58 operates in a synchronous reference frame aligned with the quadrature axis network voltage VQ_NET. FIG. 5 shows the overall direct and quadrature current axis current regulators of the network bridge 14.

In addition to the limited quadrature axis current demand signal IQ_NET*_LIM and a limited direct axis current demand signal ID_NET*_LIM (that is the output of the limitation block 66), the current controller 58 is also supplied with a quadrature axis current feedback signal IQ_NET and a direct axis current feedback signal ID_NET that are derived from the measurement of the network bridge phase currents IR, IY and IB. The conversion from three-phase components in a stationary reference frame to direct/quadrature components in a synchronous reference frame is achieved using a combined Clarke/Park transform block 70. The transform uses the network voltage angle θMAINS for the conversion.

The current controller 58 operates by comparing the limited direct axis current demand signal ID_NET*_LIM with the direct axis current feedback signal ID_NET and the limited quadrature axis current demand signal IQ_NET*_LIM with the quadrature axis current feedback signal IQ_NET and applying the resulting errors to independent PI controllers. The outputs from the PI controllers are then summed with cross-coupling signals derived from the product of current demands and network side circuit impedance values to produce a total output voltage for the direct and quadrature axes, VD_NET* and VQ_NET* respectively. The cross-coupling terms are shown in FIG. 5 and emulate the standard voltage equations for the overall network circuit in the steady state. With reference to the cross-coupling terms, LN is the network filter inductance and WN is the frequency of the network voltage waveform.

The final voltage outputs from the current controller 58, VD_NET* and VQ_NET* are converted from Cartesian to polar co-ordinates using a co-ordinate converter 64. The total voltage magnitude V_NET* is calculated according to the equation:

$$V\_NET^* = \sqrt{(VD\_NET^{*2} + VQ\_NET^{*2})}$$

and supplied to the gate drive command signal controller 62. The angle between the total voltage magnitude V_NET* and the quadrature axis voltage VQ_NET* is θ_NET and is calculated from the arctangent of VD_NET*/VQ_NET* as follows:

$$\theta\_NET = \arctan\left(\frac{VD\_NET^*}{VQ\_NET^*}\right)$$

The angle θ_NET between the total voltage magnitude V_NET* and the quadrature axis voltage VQ_NET* is added to the network voltage angle θMAINS to determine the angle at which the total voltage is to be impressed by the network bridge 14 on the total network side circuit.

The individual upper (U) and lower (L) gate drive command signals for the three-phases R, Y and B resulting in individual signals RU, RL, YU, YL, BU and BL of the network bridge 14 are calculated in the pulse width modulation generator 60 using the total voltage magnitude V_NET*, the sum of the angles θ_NET and θMAINS and the pulse width modulation frequency. The dc link voltage feedback signal VDC_FB is also factored into these PWM calculations. The dc link voltage feedback signal VDC_FB can be derived independently when independent controllers are used for the network bridge 14 and the generator bridge 10, respectively. This is particularly necessary when the generator bridge 10 and the network bridge 14 are physically remote from each other and a significant inductance exists between the dc link capacitance of each bridge. In situations where an independently-derived dc link voltage feedback signal is provided for each bridge then it will be readily appreciated that the following substitution should be made:

For the network bridge 14: VDC_FB=VDC_FB_NET
For the generator bridge 10: VDC_FB=VDC_FB_GEN In situations where a network voltage dip occurs, the limitation block 66 calculates the respective allocation of available current from the network bridge 14, based on its thermal limits, to the quadrature and direct axes and also calculates the maximum generator dc link current IDC_LIM. The signal IDC_LIM supplied from the network bridge controller 46 to the generator bridge controller 18 is used to rapidly set the level of current that can be provided by the generator bridge 10 to the intermediate dc link 12.

Different requirements exist within the various network codes giving priority to active or reactive current output and the percentages of reactive current required as a function of dip magnitude. In other words, the behaviour of the power converter depends on how it is parameterised for operation in different countries or regions.

Overall, the operation of the power converter is fundamentally different from the operation of the conventional power converters described above because it maintains control of the dc link 12 during network voltage dips by directly controlling the power flow from the generator 4. By maintaining control of the dc link voltage during a network voltage dip it is possible to maintain the required reactive current output from the network bridge 14 to meet the voltage support requirements of the power network.

During a network voltage dip, the network bridge dc link voltage controller (a combination of the PI controller 50 and the preceding summing node) becomes the master of the power converter system and allocates both power limit and dc link current limit signals to both the network bridge 14 and the generator bridge 10, respectively, on the basis of the magnitude of the network voltage dip.

The export of power from the dc link 12 is determined by power referencing applied to the network bridge 14. As more power is exported from the dc link 12 (to discharge it) then the generator bridge 10 will react to this to take more power from the generator 4 to refill the dc link. This is in direct contrast to conventional four-quadrant power converters where power is loaded into the dc link to increase the dc link voltage as a result of the torque demand applied to the generator bridge. Export of power to the network is then determined by the action of the network bridge controller when the dc link voltage exceeds the network bridge voltage demand.

Operation of the Power Converter

One possible operational implementation of the above power converter topology is as follows. At start-up, the dc link voltage demand signal VDC_NET* is set to 1050 volts. The semiconductor power switching devices in the network bridge 14 are enabled and, under control of the network bridge controller 46, bring the dc link voltage up to 1050 volts. This will almost always require an importation of power from the supply network to the dc link 12 so the quadrature axis current demand output signal IQ_NET* will result in power flow into the dc link in this start-up condition.

At the same time, the dc link voltage demand signal VDC_GEN* applied to the generator bridge power controller 18 is set to 1100 volts.

Assuming that the wind is blowing and the wind turbine 2 is rotating, when the generator bridge 10 is enabled it will control the direct axis current ID_GEN to achieve the necessary magnetic flux in the generator 4 for the prevailing speed The power converter operates in a dynamic manner to accommodate changes in wind speed. For example, for an increasing wind speed the speed of rotation of the wind turbine 2 will also increase hence providing an increasing power export demand signal P* to the network bridge controller 46. The network bridge controller 46 causes the network bridge 14 to export more power from the dc link 12 to the supply network. Increasing the amount of power that is exported to the supply network leads to a drop in the dc link voltage. The generator bridge controller 18 responds to this drop in the dc link voltage by the action of the dc link voltage controller 76 (comprising the PI controller 20 and the preceding summing node) to cause the generator bridge 10 to draw more power from the generator 4 to provide in more current into the dc link 12 until a new steady state is achieved (i.e. where the amount of power that is supplied to the supply network from the network bridge 14 is equal to the amount of power that is supplied to the generator bridge 10 from the generator 4). In this steady state, the dc link voltage has matched the dc link voltage demand signal VDC_GEN*. For reduction in wind speed, the opposite control actions take place.

During the same conditions of an increasing wind speed, the power converter described in U.S. Pat. No. 5,083,039 modifies a torque demand signal that is supplied to the generator bridge controller to cause an increasing generator torque and hence increasing power flow from the generator through the generator bridge to the dc link. This causes an increase in the dc link voltage. The network bridge controller then responds to the increase in the dc link voltage by the action of its dc link voltage controller to increase the amount of power that is exported to the supply network and hence reduce the dc link voltage back to its reference value.

U.S. Pat. No. 5,083,039 therefore describes a situation where more power flow is "pushed" through the power converter from the generator into the dc link in response to an increase in wind speed, and the secondary response is to export power from the dc link to the supply network through the network bridge. However, the power converter of the present invention operates in an opposite manner such that, in response to an increase in wind speed, the more power is "pulled" out of the dc link conditions, and the quadrature axis current IQ_GEN will be adjusted under the control of the generator bridge 10 to achieve the objective of a dc link voltage of 1100 volts.

As the dc link voltage increases to achieve the objective of 1100 volts it will exceed the dc link voltage demand signal VDC_NET* for the network bridge 14. As a result, the error signal derived by the network bridge controller 46 when subtracting the dc link voltage demand signal VDC_NET* from the voltage feedback signal VDC_FB will act such that power is transferred from the dc link 12 into the supply network, the magnitude of this power transfer being limited (the limit function block 52) by a signal derived from the power export demand signal P*. The speed sensor signal N is filtered to provide a first filtered speed signal N' and a second filtered speed N'2. The damping gain KD applied to the second filtered speed signal N'2 provides damping of shaft resonance in the turbine drive train. The first filtered speed signal N' is used as the pointer to a pre-calculated P* versus N' look-up table 56. The power export demand signal P* derived from the look-up table 56 is applied to the power controller 46 for the network bridge 14. The applied power export demand signal P* is divided by the prevailing quadrature axis network voltage VQ_NET to obtain a limit signal to apply to the quadrature axis current demand output signal IQ_NET* derived from the dc link voltage demand signal VDC_NET* for the network bridge 14.

In the event of a network voltage dip, the allocation of rated output power (VA) to the active and reactive axes of the network bridge controller 46 will be determined in line with the requirements of the specific network code for which the wind turbine is parameterised. The Apparent Power Limit is calculated from the prevailing voltage V_NET as measured by the network voltage feedback circuits and the network inverter overload current rating I_OVERLOAD. More particularly:

$$\text{Apparent Power Limit} = \sqrt{3}(V\_NET \times I\_OVERLOAD)$$

In FIG. 4, the input DRIVE RATING is equivalent to I_OVERLOAD in the above equation. 12 by the network bridge 14, and the secondary response is to import power to the dc link from the generator 4 through the generator bridge 10 to achieve more current in the dc link.

Alternative Power Converter Topologies

The basic topologies of two different alternative power converter arrangements will be outlined with reference to FIGS. 8 to 14. The alternative power converters are very similar to the power converter of FIG. 1 and like parts have been given the same reference numerals. The purpose of the topologies of the alternative power converters is to eliminate one or up to three features of the power converter of FIG. 1, namely (i) the dc link voltage demand signal VDC_NET* for the network bridge 14 and its associated voltage feedback signal VDC_FB and PI controller 50, (ii) the signal IDC_LIM that is supplied from the network bridge controller 46 and used to limit the dc link current demand signal IDC_GEN* during grid fault conditions, and (iii) the power feedforward signal POWER_FF that is produced by the current controller 26.

Figure 9:
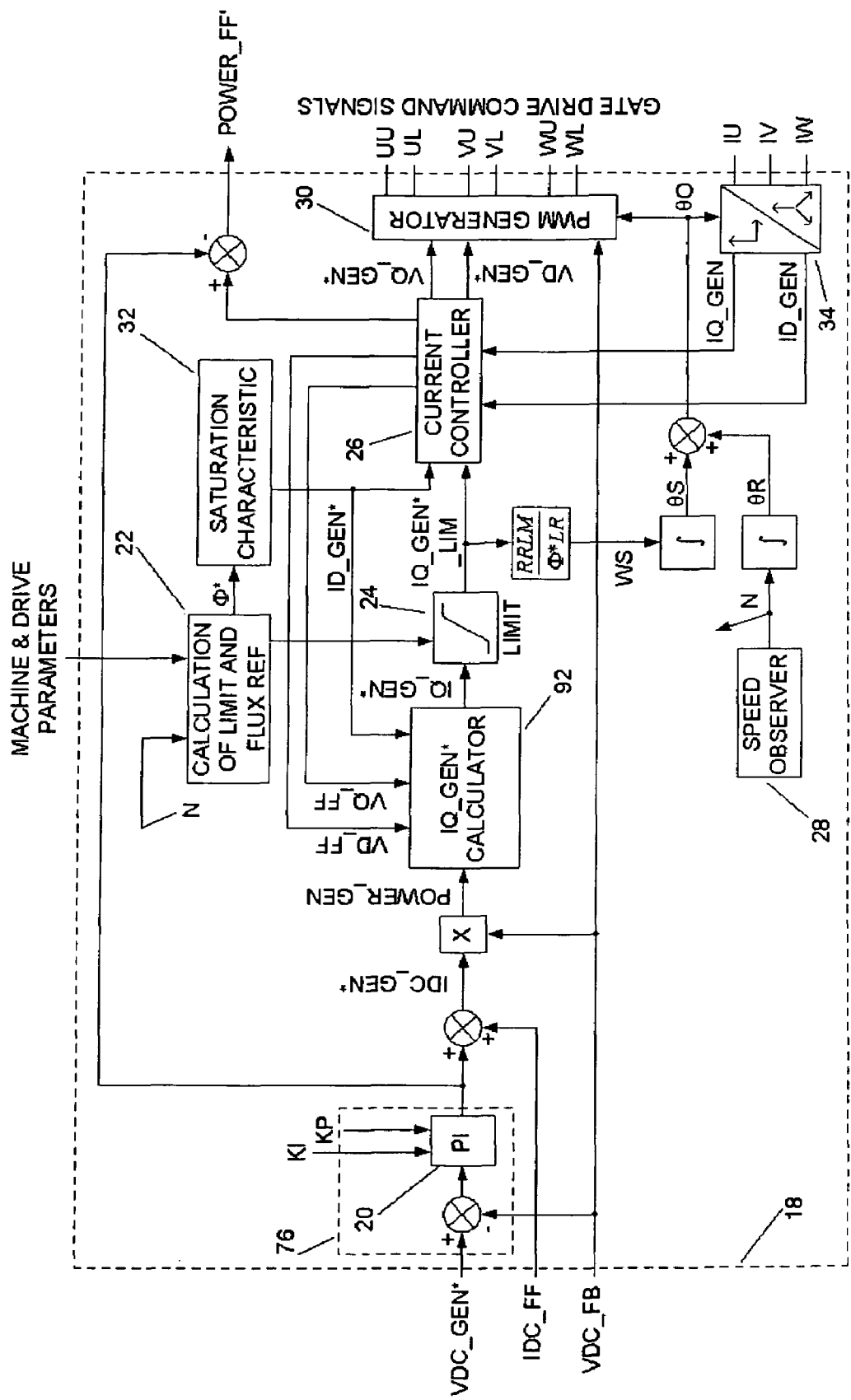
FIG. 9 is a schematic drawing showing more detail of the dc link voltage and subordinate current controls for the generator bridge (active rectifier) of FIG. 8.

The first alternative power topology eliminates only the features of the dc link voltage demand signal VDC_NET* for the network bridge 14, its associated voltage feedback signal VDC_FB and PI controller 50. It also modifies the action of the signal IDC_LIM by replacing this with a new feedforward signal IDC_FF. A modified power feedforward signal POWER_FF' remains active but is only used by the network bridge controller 46 during a supply network voltage dip situation. In this case only, the modified power feedforward signal POWER_FF' is calculated from the standard power feedforward signal POWER_FF described elsewhere minus the output of the PI controller 20 of the dc link voltage controller 76. This is shown in FIG. 9. The modified power feedforward signal POWER_FF' is used in the network bridge controller 46 together with a signal (labelled IQ_CAPACITY) relating to the IQ capacity of the network bridge 14 during a supply network voltage dip situation, the power limit POWER_LIMIT and a signal relating to the amplitude of the prevailing network voltage VQ_NET to calculate a limited quadrature axis current demand signal IQ_NET*_LIM that is used during a supply network voltage dip situation. The normal source for the signal IQ_NET*_LIM is ignored in this situation.

In topologies where the dc link voltage demand signal for the network bridge VDC_NET* is eliminated then the network bridge 14 can be energised using the network voltage. The dc link voltage is determined by the rectified value of the network voltage, which is nominally $\sqrt{2} \times$VLL (i.e. the line to line voltage at the ac terminals of the network bridge 14). This establishes a dc power supply from which auxiliary circuits, such as the microprocessor(s) for the generator bridge controller 18 and the network bridge controller 46, and the gate drive power for the generator bridge 10 and network bridge 14, can be derived. The dc link voltage is then available to provide fluxing of the generator 4 and bring it under control.

Assuming that the wind is blowing and the wind turbine 2 is rotating then the generator 4 can start to provide power to the dc link 12 and achieve a dc link voltage that is equal to the dc link voltage demand signal VDC_GEN*.

Figure 8:
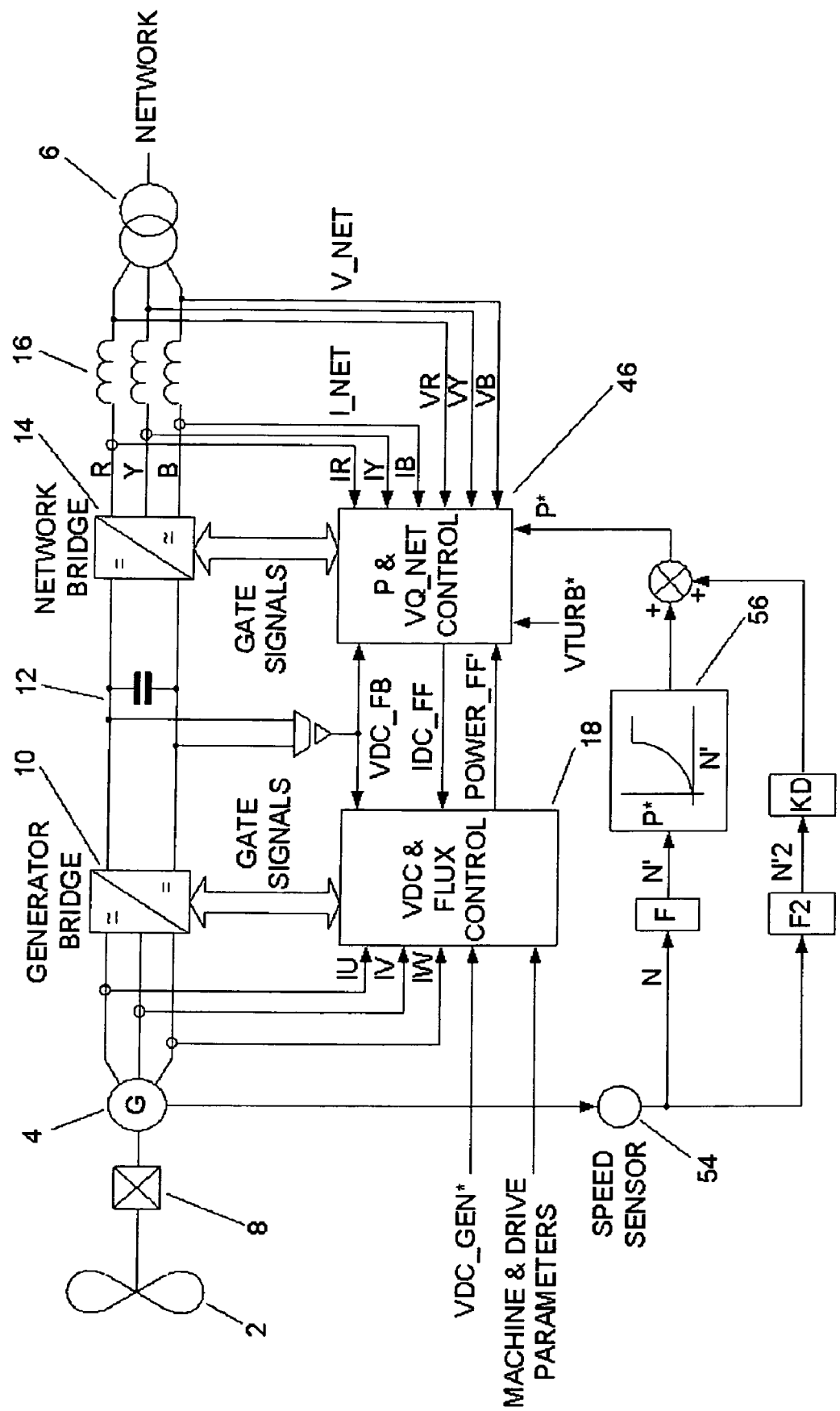
FIG. 8 is a schematic drawing showing how a first alternative power converter according to the present invention is used to interface between a wind turbine driving a variable speed generator and a fixed frequency power network.
Figure 10:
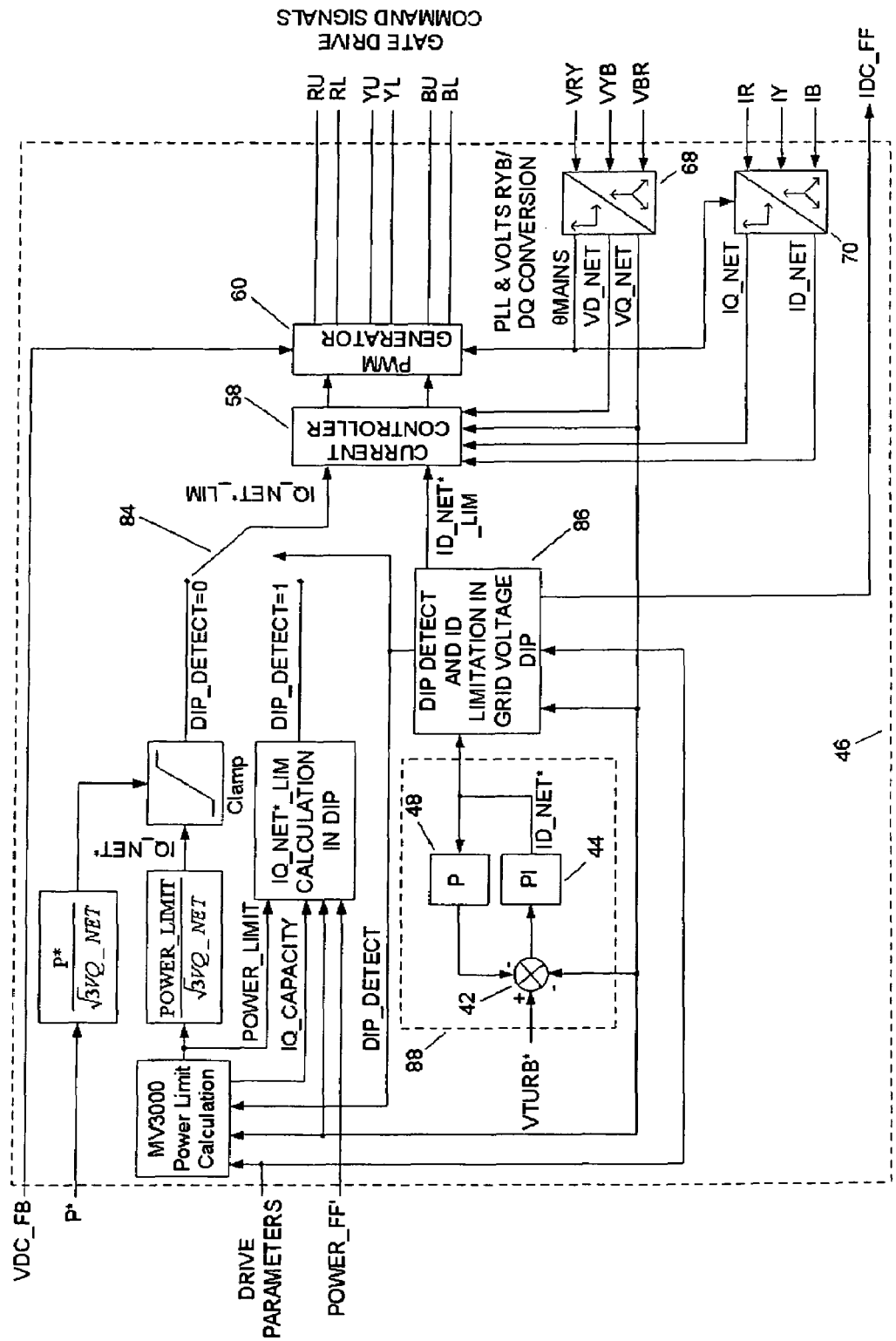
FIG. 10 is a schematic drawing showing more detail of the power control, network voltage control and subordinate current controls for the network bridge (inverter) of FIG. 8.

The basic topology of the first alternative power converter arrangement will now be described with reference to FIGS. 8 to 10. In this arrangement, the dc link voltage controller 76 of the generator bridge controller 18 remains active under all operating conditions. In steady state conditions, the action of the integral term within the PI controller 20 of the dc link voltage controller 76 is minimised by the inclusion of the feedforward signal IDC_FF from the network bridge controller 46. In supply network voltage dip situations, the feedforward signal IDC_FF provides information about the amount of dc current to be provided by the generator bridge 14 in response to changes in the supply network voltage. The signal IDC_FF is calculated in the function block 90. By including these features, the variation in the dc link voltage during supply network voltage dip situations is minimised. Also the action required by the integral term within the PI controller 20 of the dc link voltage controller 76 is minimised and therefore requires much smaller deviations in the actual dc link voltage to increase or decrease the integral value to the correct value to achieve steady state operation.

The basic topology of the second alternative power converter arrangement will now be described with reference to FIGS. 11 to 14. In this arrangement, the dc link voltage of the network bridge controller 46 is eliminated in the same manner as described above.

Figure 11:
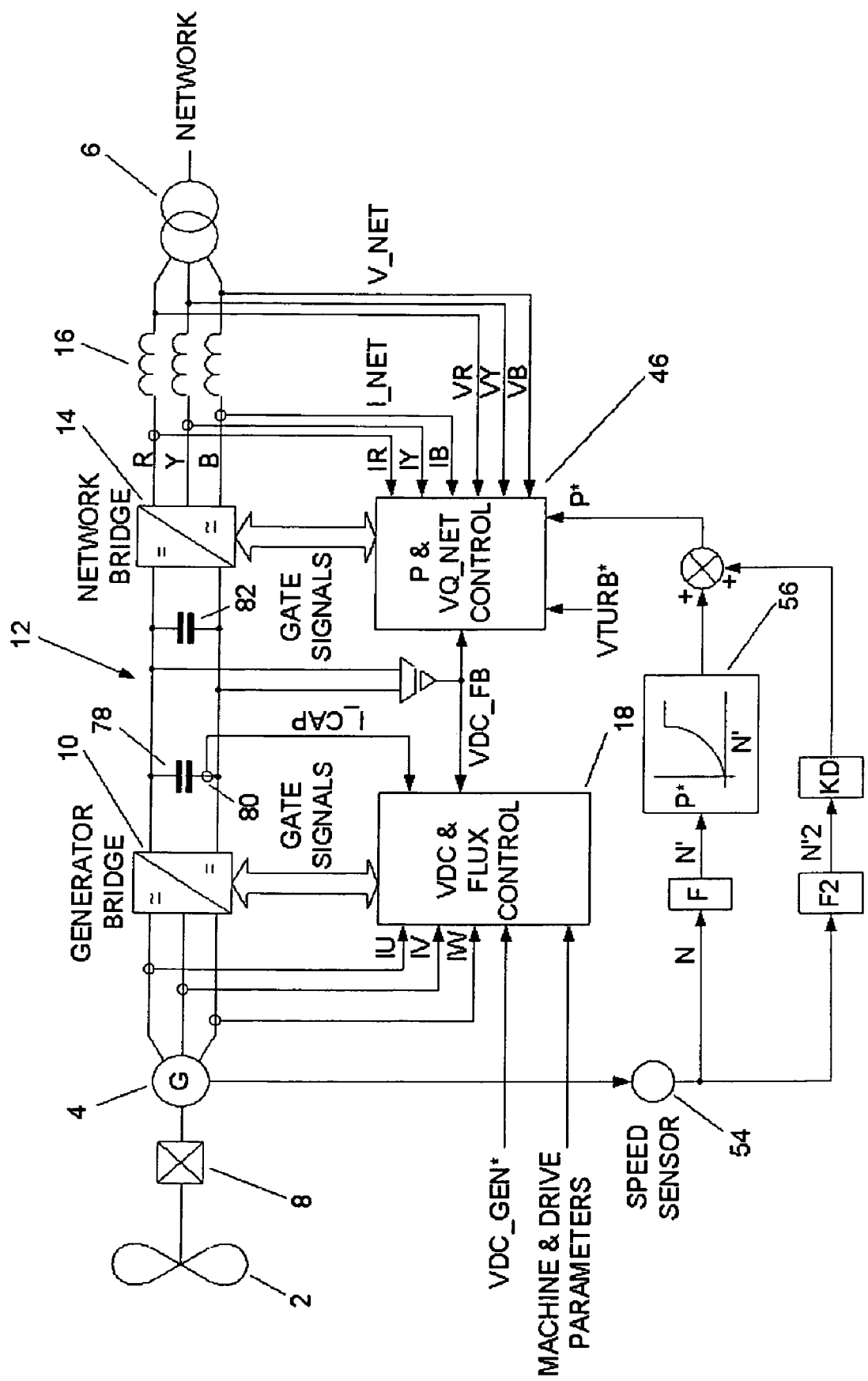
FIG. 11 is a schematic drawing showing how a second an alternative power converter according to the present invention is used to interface between a wind turbine driving a variable speed generator and a fixed frequency power network.

A first option for dc link control for the generator bridge 10 of the second alternative power controller arrangement will now be described with reference to FIGS. 11 and 12. The purpose of the signal IDC_LIM in the power converter of FIG. 1 is to pass critical information about the prevailing network voltage conditions and power throughput levels to the generator bridge controller 18. This is particularly important during a supply network voltage dip situation when the power throughput capability is severely limited. In the alternative power converter the signal IDC_LIM is replaced by an inferred signal IDC_NET' that is used only by the generator bridge controller 18.

The inferred signal IDC_NET' is calculated from information that is available to the generator bridge controller 18 by the following equation:

$$IDC\_NET' = \left(\frac{POWER\_FF}{VDC\_FB}\right) - I\_CAP$$

Figure 3:
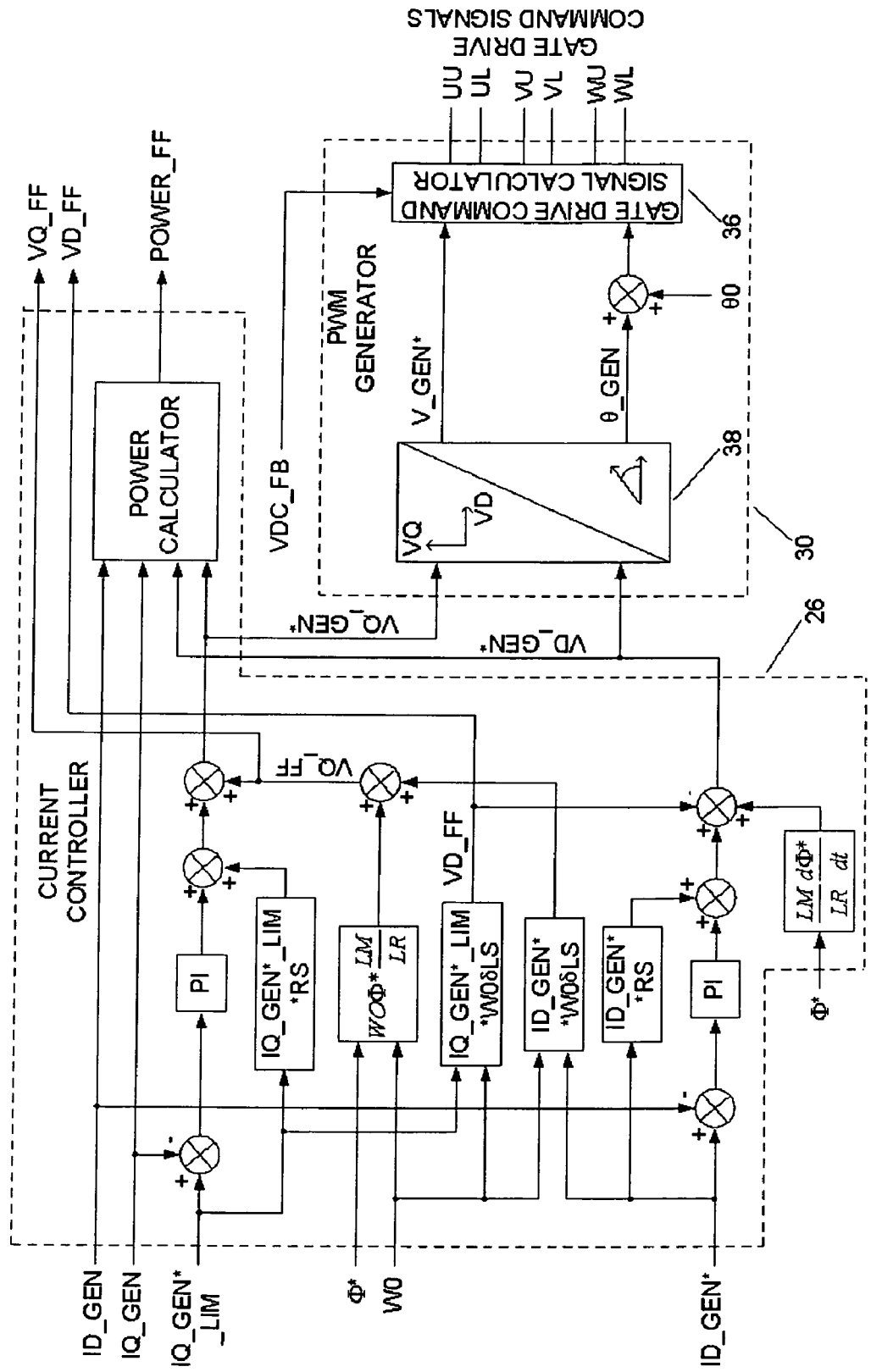
FIG. 3 is a schematic drawing showing more detail of the current control for the generator bridge (active rectifier) of FIG. 1.

In the alternative power converter, the power feedforward signal POWER_FF is derived from the current controller 26 of the generator bridge controller 18 as illustrated in FIG. 3 using the equation:

POWER_FF= $\sqrt{3}(VQ\_GEN^* \times IQ\_GEN + VD\_GEN^* \times ID\_GEN)$

However, the power feedforward signal POWER_FF is not supplied to the network bridge controller 46 but is used only by the generator bridge controller 18 in the derivation of the inferred signal IDC_NET'. (POWER_FF has the same derivation here as the POWER_FF of the first arrangement shown in FIG. 2. The signal name is kept the same for consistency in this specification, however the POWER_FF in this instance is not a literal power feedforward signal.) The inferred signal IDC_NET' is used to indicate the effective dc current that the network bridge 14 is exporting to the supply network but is calculated from the conditions of the generator bridge 10.

Dividing the generator power signal POWER_FF by the voltage feedback signal VDC_FB gives the effective dc current being supplied to the dc link 12 from the generator bridge 10.

Measurement of the current charging (or discharging) of the bulk capacitor 82 in the dc link 12 is achieved by adding a small capacitor 78 in parallel with the bulk capacitor, measuring the current in the small capacitor using a current sensor 80 and re-scaling the measured current by a factor related to the ratio of the capacitance of the small capacitor and the total capacitance of the dc link 12. The sign of the current signal I_CAP is positive when the bulk capacitor 82 is being charged and negative when it is being discharged. Since the current flowing in the bulk capacitor 82 is a switched waveform it is necessary to integrate the current over a full pulse width modulation (PWM) period.

Figure 12:
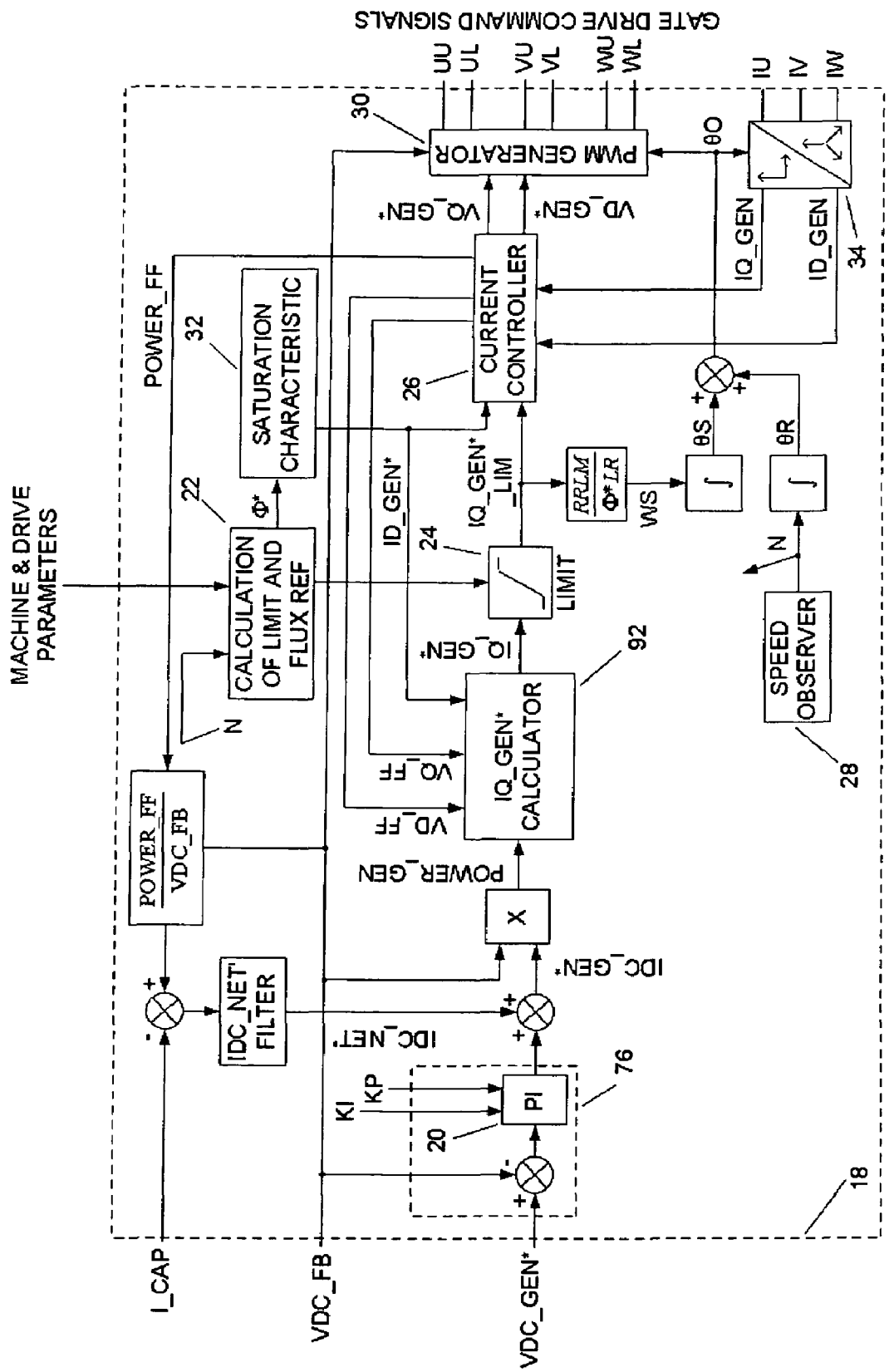
FIG. 12 is a schematic drawing showing more detail of a first option for dc link control for the generator bridge (active rectifier) of FIG. 11.

The inferred signal IDC_NET' is added to the output of the dc link voltage controller 76 at the summing node shown in FIG. 12.

When a supply network voltage dip situation occurs, in the first instance the generator bridge 10 is unaware that the network bridge 14 is no longer able to export power to the supply network at the previous rate. The surplus current between that being imported from the generator 4 and that being exported to the supply network charges the bulk capacitor 82 and is seen as an increasing signal on the bulk capacitor charging current derived from the current signal I_CAP. The signal IDC_NET' is then recalculated and modifies the signal being added to the output of the dc link voltage controller 76 hence modifying the actual power that is being imported from the generator 4 during the supply network voltage dip situation.

In situations where the bulk dc link capacitance of the generator bridge 10 and the network bridge 14 are separated by a significant distance there may be an inter-bridge inductance that causes a resonance between the two decoupled bulk capacitors. In this case, the small capacitor 78 may be replaced by a network of two capacitors and an inductor that are selected to achieve the same resonant frequency as the combination of the capacitance of the decoupled bulk capacitors and the inter-bridge inductance. The current is then measured as the current flowing in both of the small capacitors so that any resonance between them is cancelled out by the measurement process.

Figure 13:
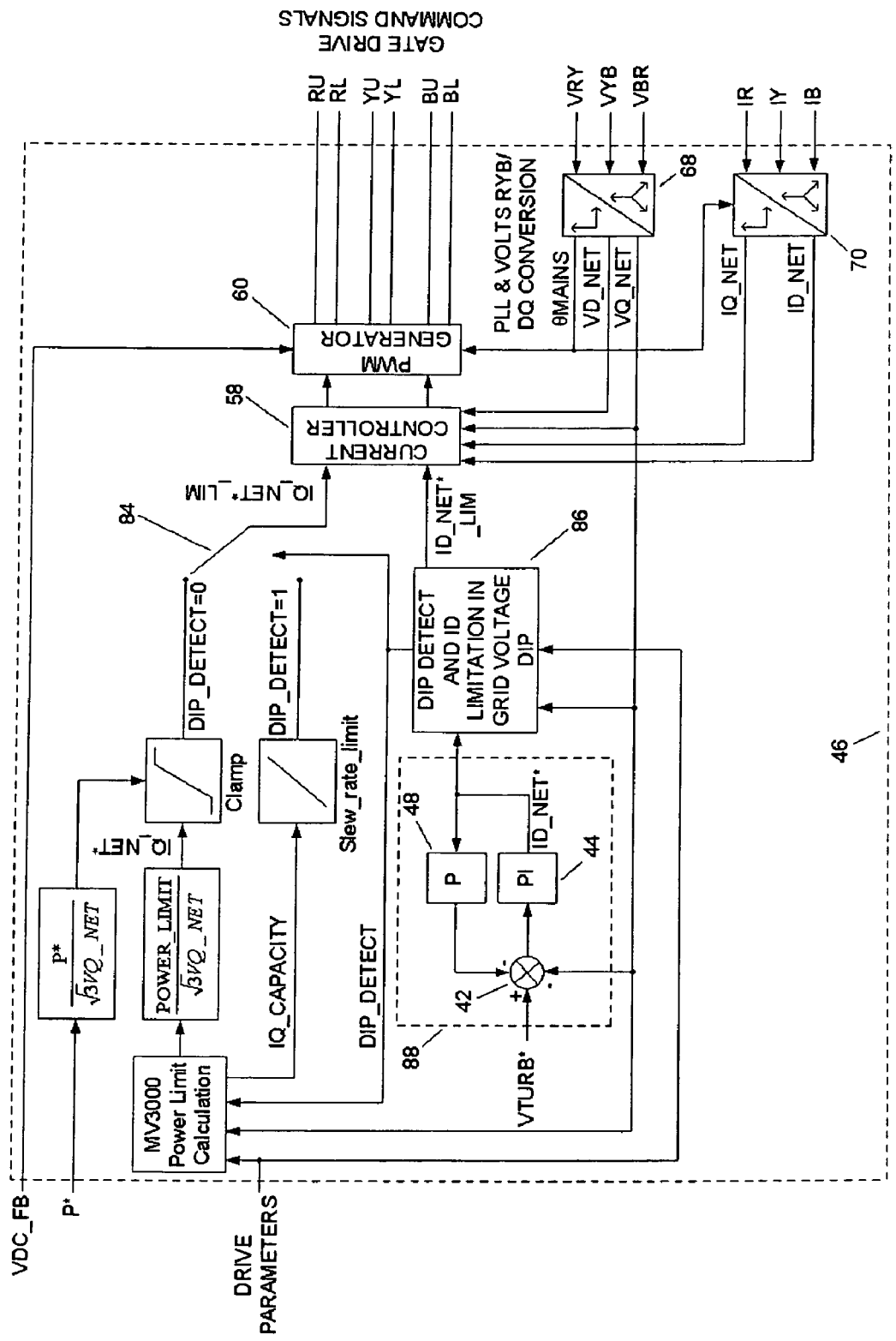
FIG. 13 is a schematic drawing showing more detail of the power control for the network bridge (inverter) of FIG. 11.

The power control for the network bridge 14 will now be described in more detail with reference to FIG. 13.

IQ_CAPACITY is a signal that relates to the drive rating parameters and the prevailing network voltage VQ_NET. It will be appreciated that the generator bridge 10 and the generator bridge controller 18 together have a finite response time to changes in operating conditions. To take account of this within the network bridge controller 46, the signal IQ_CAPACITY is slew rate limited to produce a limited quadrature axis current demand signal IQ_NET*_LIM that applies only during a supply network voltage dip situation. The slew rate limit is tuned such that the limited quadrature axis current demand IQ_NET*_LIM reduces at the same rate as the power is reduced in the generator bridge 10. The slew rate limit is correctly tuned when the dc link voltage disturbance occurring during a supply network voltage dip situation is minimised.

The switch 84 takes the output from a slew-rate limit function when DIP_DETECT=1 (i.e. when a supply network voltage dip situation is determined to exist by the limitation block 86 with reference to specific network voltage conditions and the parameterisation of the network bridge controller 46). Otherwise, in normal operating situations when DIP_DETECT=0 then the quadrature axis current demand signal IQ_NET* is derived from the prevailing network voltage VQ_NET and the ultimate power limit POWER_LIMIT determined by the drive parameters as shown in FIG. 12. The quadrature axis current demand signal IQ_NET* is limited by a clamp function determined by the power export demand signal P* and the prevailing network voltage VQ_NET. When DIP_DETECT=0 the output of the clamp function is applied to the current controller 58 as the quadrature axis current demand signal IQ_NET*_LIM.

The limitation block 86 provides a limited direct axis current demand signal ID_NET*_LIM to the current controller 58 in a supply network voltage dip situation. In normal operating situations, the direct axis current demand signal ID_NET* is supplied directly to the current controller 58 as the limited direct axis current demand signal ID_NET*_LIM.

A second option for dc link control for the generator bridge 10 of the second alternative power controller arrangement will now be described with reference to FIGS. 11 and 14.

If the power converter is operating at full capacity, for example, then the integral of the PI controller 20 of the dc link voltage controller 76 will have a significant value. In the absence of any other control features, in the event of a network supply voltage dip then a dc link voltage error would have to occur to discharge or reset the integral value. Such a dc link voltage error would be a positive voltage transient with a risk of a dc link over-voltage trip occurring due to finite hardware voltage limitations.

During a supply network voltage dip situation, the rate of change of the voltage feedback signal VDC_FB indicative of the dc link voltage (as represented by dVDC_FB/dt) is significantly larger than would be experienced during normal operation of the power converter. If dVDC_FB/dt is greater than a threshold it can be deduced that something has affected the ability of the network bridge 14 to export power and it is probably the case that the network voltage has reduced.

Figure 14:
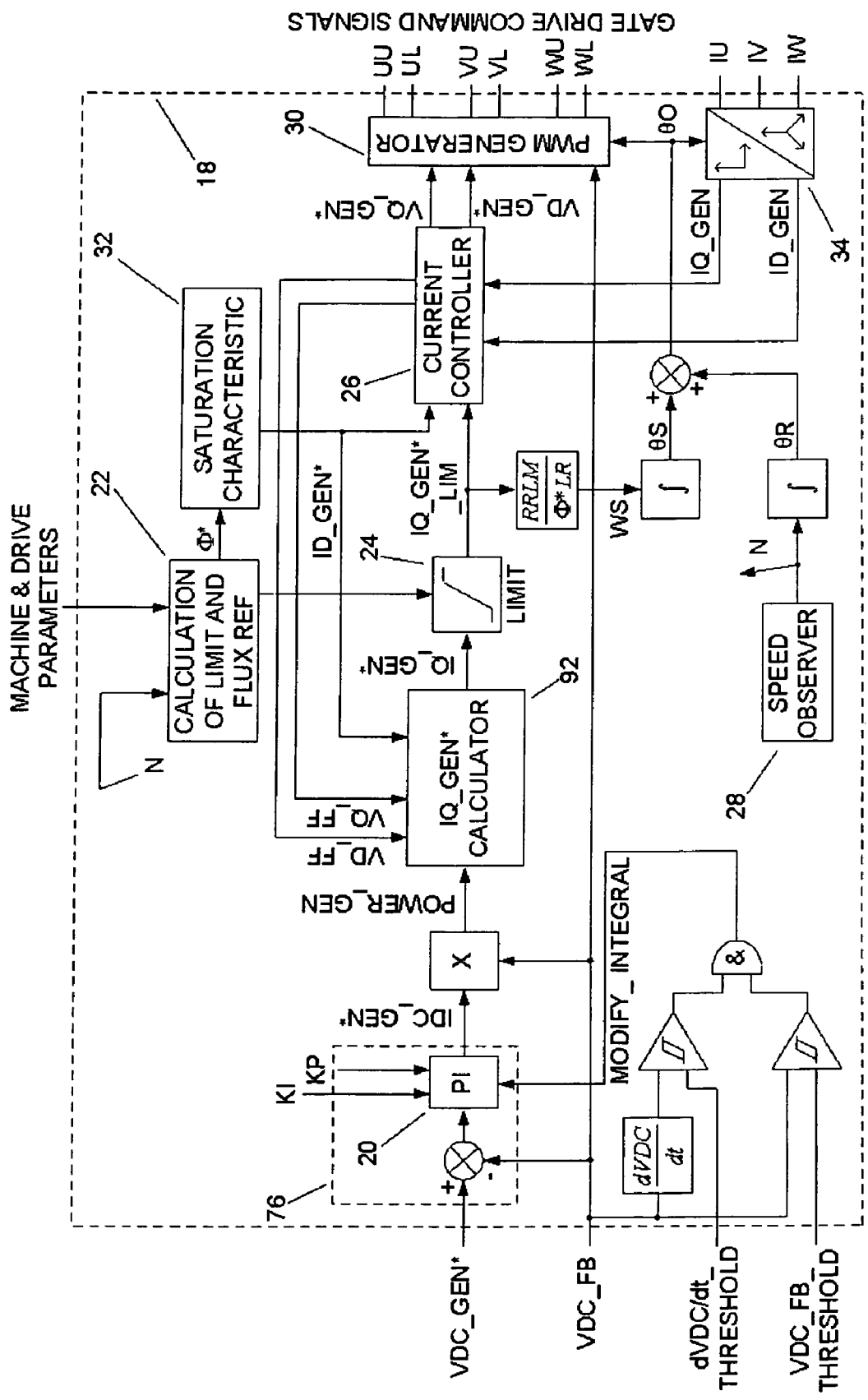
FIG. 14 is a schematic drawing showing more detail of a second option for dc link control for the generator bridge (active rectifier) of FIG. 11.

The second option for dc link control shown in FIG. 14 is based on a determination that if the voltage feedback signal VDC_FB is greater than a first threshold (VDC_FB_THRESHOLD) and dVDC_FB/dt is greater than a second threshold (dVDC_FB/dt_THRESHOLD) then the integral value in the PI controller 20 is multiplied by a value less than 1 where the value is determined by parameterization of the generator bridge controller 18.

If these threshold requirements continue to be exceeded then the same dc link control action will be applied on consecutive PWM scans (i.e. where a single PWM scan represents one iteration of the control program) such that the integral value in the PI controller 20 is sequentially reduced.

The two threshold parameters are based on knowledge of the wind turbine characteristics, the maximum expected dVDC_FB/dt during normal operation and the expected dVDC_FB/dt in the event of a grid fault. The maximum expected dVDC_FB/dt during normal operation can be calculated with knowledge of the dc link capacitance and drive parameters.

Operation of the Alternative Power Converter

One possible operational implementation of the alternative power converter topology shown in FIGS. 11 to 14 is as follows. At start-up, the dc link voltage is established by suitable pre-charge circuits (not shown) from the transformer 6 shown in FIG. 11. At this point the semiconductor power switching devices in the network bridge 14 remain disabled.

The dc link voltage demand signal VDC_GEN* applied to the generator bridge power controller 18 is set to 1100 volts.

Assuming that the wind is blowing and the wind turbine 2 is rotating, when the generator bridge 10 is enabled it will control the direct axis current ID_GEN to achieve the necessary magnetic flux in the generator 4 for the prevailing speed conditions, and the quadrature axis current IQ_GEN will be adjusted under the control of the generator bridge 10 to achieve the objective of a dc link voltage of 1100 volts.

The power export demand signal P* is set to zero and the output of the turbine network voltage controller 88 (and more particularly the PI controller 44) is clamped at zero. At this point the semiconductor power switching devices in the network bridge 14 are enabled.

In the normal mode of operation where the supply network voltage seen at the ac terminals of the network bridge 14 is within normal limits then the following control action is implemented. The speed sensor signal N is filtered to provide a first filtered speed signal N' and a second filtered speed N'2. The damping gain KD applied to the second filtered speed signal N'2 provides damping of shaft resonance in the turbine drive train. The first filtered speed signal N' is used as the pointer to a pre-calculated P* versus N' look-up table 56. The power export demand signal P* derived from the look-up table 56 is applied to the power controller 46 for the network bridge 14. The applied power export demand signal P* is divided by the prevailing quadrature axis network voltage VQ_NET to obtain a limit signal. This limit signal is applied via a clamp function to the quadrature axis current demand signal IQ_NET* to form the quadrature axis current demand signal IQ_NET*_LIM.

In this mode of operation, the quadrature axis current demand signal IQ_NET* is set to a value greater than the maximum value that can be derived from the power export demand signal P* so that the damping function described above remains active.

In the event of a supply network voltage dip, the allocation of rated output power (VA) to the active and reactive axes of the network bridge controller 46 will be determined in line with the requirements of the specific network code for which the wind turbine is parameterised.

Practical Implementations of the Power Converter Topology

The power converter topology arrangements can be implemented as follows. The generator bridge 10 and network bridge 14 can each be implemented using a MV3000 liquid cooled DELTA inverter module of suitable power rating. This is an IGBT-based voltage source inverter suitable for operation on a 690 V ac network with a resulting dc link voltage of 1100 V. The generator bridge controller 18 and the network bridge controller 46 can each be implemented using a MV3000 DELTA controller. This is a microprocessor-based electronic controller, the firmware for which incorporates the functionality necessary to realise the above power control schemes. The microprocessor operates on a fixed time base, sometimes referred to as "scan time", relating to the pulse width modulation (PWM) frequency of the controller. All these products are supplied by Converteam Ltd of Boughton Road, Rugby, Warwickshire, CV21 1BU.

Possible Modifications to the Power Converter Topology

The proposed power converters described above can be arranged in a similar manner if the induction generator 4 is replaced by a permanent magnet or wound field synchronous generator. In situations where a wound field synchronous generator is employed, the additional field excitation input to the generator will typically be used to provide the main flux with the direct axis stator current demand signal being set to zero. For high dynamic and/or field weakening situations, the direct axis stator current demand signal may be set to values other than zero to more rapidly adjust the flux in the generator. Typically, the generator will be a three-phase machine but other phase numbers can be employed. The power converter can also be arranged to operate with multi-level inverters instead of the two-level inverter arrangement described above.

The controller arrangement described above proposes two independent controllers that are coordinated by means of control signals being sent from the generator bridge controller 18 to the network bridge controller 46 and vice versa. It would be equally suitable to integrate the functionality of the controllers on to one physical controller. Similarly, the functionality could be spread across more than two controllers if this is convenient to the practical implementation of the power converter.

What is claimed is:

1. A method of operating a wind turbine comprising a generator that provides variable voltage at variable frequency and has a stator and a rotor, a turbine assembly including at least one blade for rotating the rotor of the generator, and a power converter that interfaces the generator to a supply network operating at nominally fixed voltage and nominally fixed frequency, the power converter including:
    a first active rectifier/inverter electrically connected to the stator of the generator and including a plurality of semiconductor power switching devices;
    a second active rectifier/inverter including a plurality of semiconductor power switching devices;

a dc link connected between the first active rectifier/inverter and the second active rectifier/inverter;
a filter connected between the second active rectifier/inverter and the supply network, the filter including network terminals;
a first controller for the first active rectifier/inverter; and
a second controller for the second active rectifier/inverter;
wherein in response to a change in wind speed the method comprises the steps of:

controlling the second active rectifier/inverter to change the level of power exported out of the dc link such that the dc link voltage changes from a desired level; and
controlling the first active rectifier/inverter to import sufficient current into the dc link through the generator bridge from the generator to restore the dc link voltage to the desired level.

* * * * *